US 9,690,694 B2

(12) United States Patent
Nellans et al.

(10) Patent No.: US 9,690,694 B2
(45) Date of Patent: Jun. 27, 2017

(54) APPARATUS, SYSTEM, AND METHOD FOR AN ADDRESS TRANSLATION LAYER

(71) Applicant: Fusion-io, Inc., Salt Lake City, UT (US)

(72) Inventors: David Nellans, Salt Lake City, UT (US); Jens Axboe, Kolding (DK); Nick Piggin, Yarralumla (AU)

(73) Assignee: SanDisk Technologies, LLC, Plano, TX (US)

( * ) Notice: Subject to any disclaimer, the term of this patent is extended or adjusted under 35 U.S.C. 154(b) by 1138 days.

(21) Appl. No.: 13/629,543

(22) Filed: Sep. 27, 2012

(65) Prior Publication Data

US 2013/0080732 A1    Mar. 28, 2013

Related U.S. Application Data

(60) Provisional application No. 61/539,902, filed on Sep. 27, 2011.

(51) Int. Cl.
*G06F 12/00* (2006.01)
*G06F 12/02* (2006.01)

(52) U.S. Cl.
CPC .. *G06F 12/0246* (2013.01); *G06F 2212/7201* (2013.01)

(58) Field of Classification Search
USPC ....................................................... 711/103
See application file for complete search history.

(56) References Cited

U.S. PATENT DOCUMENTS

| 7,970,981 | B2 * | 6/2011 | Cheon et al. | 711/103 |
| 2006/0259732 | A1 * | 11/2006 | Traut | G06F 12/109 |
| | | | | 711/173 |
| 2009/0113121 | A1 * | 4/2009 | Lee et al. | 711/103 |
| 2009/0313420 | A1 * | 12/2009 | Wiesz et al. | 711/103 |
| 2010/0332730 | A1 * | 12/2010 | Royer, Jr. | G06F 12/0246 |
| | | | | 711/103 |
| 2011/0060887 | A1 * | 3/2011 | Thatcher | G06F 3/0604 |
| | | | | 711/171 |
| 2011/0191522 | A1 * | 8/2011 | Condict | G06F 12/123 |
| | | | | 711/103 |

(Continued)

OTHER PUBLICATIONS

"NVM Express", Intel Corporation, Revision 1.0a May 11, 2011, pp. 124, Hillsboro, Oregon, US.

(Continued)

*Primary Examiner* — Jared Rutz
*Assistant Examiner* — Khoa D Doan
(74) *Attorney, Agent, or Firm* — Kunzler Law Group, PC

(57) ABSTRACT

An apparatus, system, and method are disclosed for storage address translation. The method includes storing, in volatile memory, a plurality of logical-to-physical mapping entries for a non-volatile recording device. The method includes persisting a logical-to-physical mapping entry from the volatile memory to recording media of the non-volatile recording device. The logical-to-physical mapping entry may be selected for persisting based on a mapping policy indicated by a client. The method includes loading the logical-to-physical mapping entry from the recording media of the non-volatile recording device into the volatile memory in response to a storage request associated with the logical-to-physical mapping entry.

25 Claims, 7 Drawing Sheets

(56) References Cited

U.S. PATENT DOCUMENTS

2012/0226871 A1* 9/2012 Cantin et al. ................ 711/135

OTHER PUBLICATIONS

Lee, Sehwan, "A Demand-Based FTL Scheme Using Dualistic Approach on Data Blocks and Translation Blocks", 17th IEEE International Conference on Embedded and Real-Time Computing Systems and Applications, 2011, pp. 10.

* cited by examiner

APPARATUS, SYSTEM, AND METHOD FOR AN ADDRESS TRANSLATION LAYER

CROSS-REFERENCES TO RELATED APPLICATIONS

This application claims the benefit of U.S. Provisional Patent Application No. 61/539,902 entitled "APPARATUS, SYSTEM, AND METHOD FOR AN APPLICATION DIRECTED FLASH TRANSLATION LAYER" and filed on Sep. 27, 2011 for David Nellans, which is incorporated herein by reference.

TECHNICAL FIELD

The present disclosure, in various embodiments, relates to address translation and more particularly relates to logical-to-physical address translation.

BACKGROUND

Certain types of data storage media may become less reliable with use. For example, storage media may wear out or degrade over time, with each program, erase, or the like. Each physical storage location may have a limited number of writes before the location wears out and is no longer usable.

If a storage controller provides wear-leveling for physical storage locations, however, some type of mapping must be maintained between logical addresses and physical storage locations. Metadata for such mappings can incur significant processing overhead and storage capacity. As the size of the storage device increases, the amount of mapping metadata also increases. Accessing mapping metadata can also increase latency of storage requests.

SUMMARY

A method for storage address translation is presented. In one embodiment, the method includes storing, in volatile memory, a plurality of logical-to-physical mapping entries for a non-volatile recording device. In one embodiment, the method includes persisting a logical-to-physical mapping entry from the volatile memory to recording media of the non-volatile recording device. The logical-to-physical mapping entry, in certain embodiments, is selected for persisting based on a mapping policy indicated by a client. In one embodiment, the method includes loading the logical-to-physical mapping entry from the recording media of the non-volatile recording device into the volatile memory in response to a storage request associated with the logical-to-physical mapping entry.

An apparatus for storage address translation is also presented. In one embodiment, the apparatus includes a mapping module configured to store, in volatile memory, logical-to-physical mapping entries mapping logical addresses to physical locations in a non-volatile memory device. In one embodiment, the apparatus includes a persist module configured to dynamically flush logical-to-physical mapping entries from the volatile memory to non-volatile memory media of the non-volatile memory device. The persist module, in a further embodiment, flushes the logical-to-physical mapping entries based on a plurality of client selectable mapping policies for the logical-to-physical mapping entries. In one embodiment, the apparatus includes a load module configured to dynamically load one or more logical-to-physical mapping entries from the non-volatile memory media of the non-volatile memory device into the volatile memory to service storage requests. The load module, in a further embodiment, loads the one or more logical-to-physical mapping entries without loading one or more additional logical-to-physical mapping entries from the non-volatile memory media.

A system for storage address translation is presented. The system, in one embodiment, includes a non-volatile storage device coupled to a host computing device. In a further embodiment, the non-volatile storage device includes non-volatile storage media. In one embodiment, the system includes a storage management layer for a non-volatile storage device. In a further embodiment, the storage management layer executes on the host computing device. In one embodiment, the storage management layer includes an advisement module configured to receive an advisement message from a client indicating a mapping policy for one or more logical-to-physical mapping entries for the non-volatile storage device. In one embodiment, the storage management layer includes a persist module configured to evict a logical-to-physical mapping entry from volatile memory of the host device to the non-volatile storage media of the non-volatile storage device based on the mapping policy. The eviction by the persist module, in certain embodiments, frees capacity of the volatile memory. In one embodiment, the storage management layer includes a load module configured to load a different logical-to-physical mapping entry from the non-volatile storage media into the freed capacity of the volatile memory.

A computer program product comprising a computer readable storage medium storing computer usable program code executable to perform operations for storage address translation is presented. The operations, in one embodiment, include selecting one or more logical-to-physical mapping entries of a non-volatile recording device to store in volatile memory based on a mapping policy for the one or more logical-to-physical mapping entries. In a further embodiment, the operations include selecting one or more different logical-to-physical mapping entries of the non-volatile recording device to store in recording media of the non-volatile recording device based on a different mapping policy for the different logical-to-physical mapping entries. In one embodiment, the operations include loading the one or more different logical-to-physical mapping entry from the recording media of the non-volatile recording device into the volatile memory to service a storage request.

Another apparatus is presented for storage address translation. The apparatus, in one embodiment, includes means for receiving a storage request for a non-volatile memory device. The apparatus, in a further embodiment, includes means for loading a logical-to-physical mapping entry from non-volatile memory media of the non-volatile memory device into volatile memory, the logical-to-physical mapping entry associated with the storage request. In one embodiment, the apparatus includes means for persisting a different logical-to-physical mapping entry from the volatile memory to non-volatile memory media of the non-volatile memory device to satisfy a volatile memory allotment threshold for logical-to-physical mapping entries in the volatile memory.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Figure 1A:
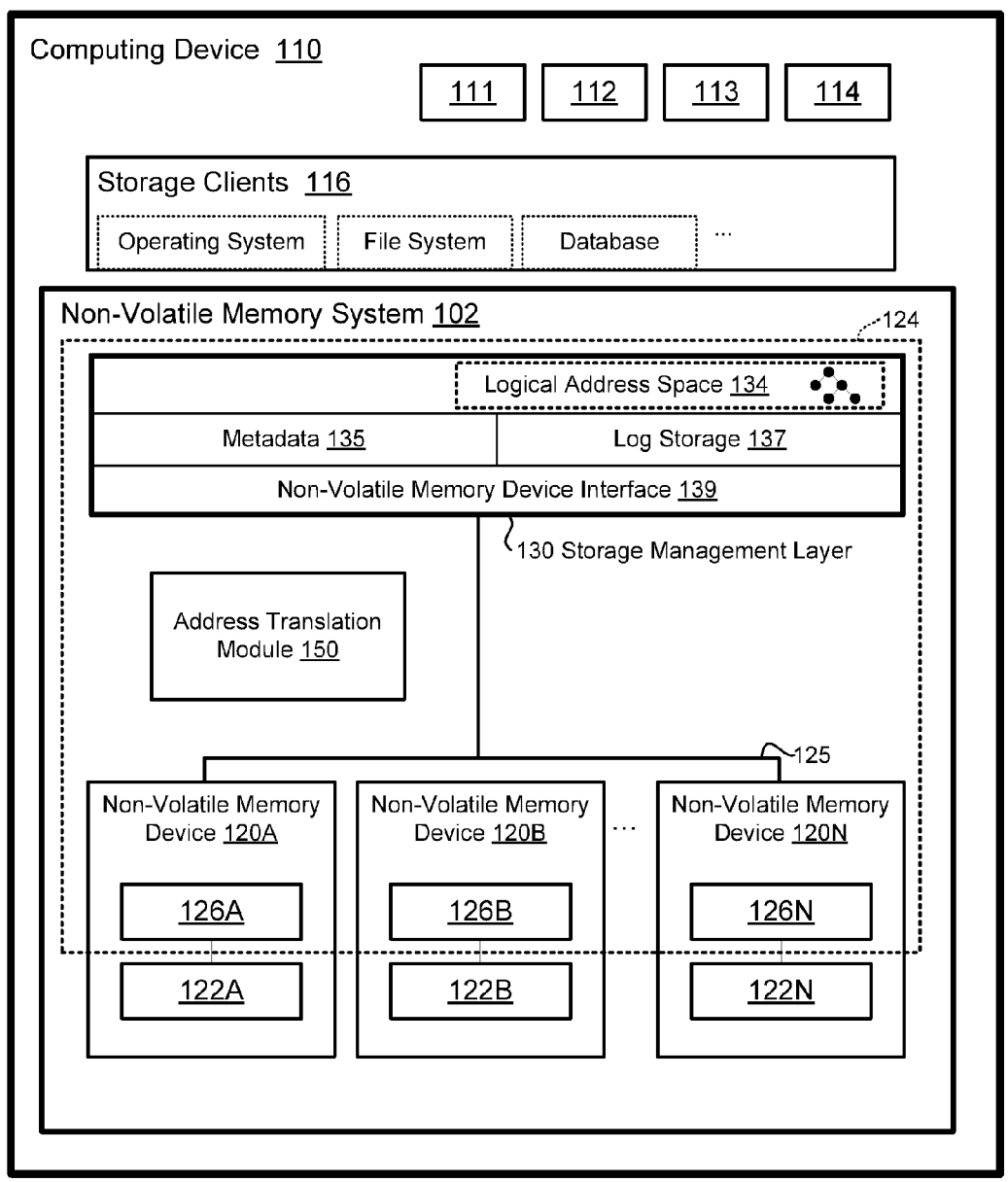
FIG. 1A is a schematic block diagram illustrating one embodiment of a system for storage address translation.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

According to various embodiments, a non-volatile memory controller manages one or more non-volatile memory devices. The non-volatile memory device(s) may comprise memory or storage devices, such as solid-state storage device(s), that are arranged and/or partitioned into a plurality of addressable media storage locations. As used herein, a media storage location refers to any physical unit of memory (e.g., any quantity of physical storage media on a non-volatile memory device). Memory units may include, but are not limited to: pages, memory divisions, erase blocks, sectors, blocks, collections or sets of physical storage locations (e.g., logical pages, logical erase blocks, described below), or the like.

The non-volatile memory controller may comprise a storage management layer ("SML"), which may present a logical address space to one or more storage clients. One example of an SML is the Virtual Storage Layer® of Fusion-io, Inc. of Salt Lake City, Utah. Alternatively, each non-volatile memory device may comprise a non-volatile memory media controller, which may present a logical address space to the storage clients. As used herein, a logical address space refers to a logical representation of memory resources. The logical address space may comprise a plurality (e.g., range) of logical addresses. As used herein, a logical address refers to any identifier for referencing a memory resource (e.g., data), including, but not limited to: a logical block address ("LBA"), cylinder/head/sector ("CHS") address, a file name, an object identifier, an inode, a Universally Unique Identifier ("UUID"), a Globally Unique Identifier ("GUID"), a hash code, a signature, an index entry, a range, an extent, or the like.

The SML may maintain metadata, such as a forward index with logical-to-physical mapping entries, to map logical addresses of the logical address space to physical media storage locations on the non-volatile memory device(s). The SML may provide for arbitrary, any-to-any logical-to-physical mappings from logical addresses to physical storage resources. As used herein, an "any-to-any" logical-to-physical mapping entry is fully associative and may map any logical address to any physical storage resource. Accordingly, there may be no pre-defined and/or pre-set mappings between logical addresses and particular, media storage locations and/or media addresses.

As used herein, a media address refers to an address of a memory resource that uniquely identifies one memory resource from another to a controller that manages a plurality of memory resources. By way of example, a media address includes, but is not limited to: the address of a media storage location, a physical memory unit, a collection of physical memory units (e.g., a logical memory unit), a portion of a memory unit (e.g., a logical memory unit address and offset, range, and/or extent), or the like. Accordingly, the SML may map logical addresses to physical data resources of any size and/or granularity, which may or may not correspond to the underlying data partitioning scheme of the non-volatile memory device(s). For example, in some embodiments, the non-volatile memory controller is configured to store data within logical memory units that are formed by logically combining a plurality of physical memory units, which may allow the non-volatile memory controller to support many different virtual memory unit sizes and/or granularities.

As used herein, a logical memory element refers to a set of two or more non-volatile memory elements that are or are capable of being managed in parallel (e.g., via an I/O and/or control bus). A logical memory element may comprise a plurality of logical memory units, such as logical pages, logical memory divisions (e.g., logical erase blocks), and so on. As used herein, a logical memory unit refers to a logical construct combining two or more physical memory units, each physical memory unit on a respective non-volatile memory element in the respective logical memory element (each non-volatile memory element being accessible in parallel). As used herein, a logical memory division refers to a set of two or more physical memory divisions, each physical memory division on a respective non-volatile memory element in the respective logical memory element.

The logical address space presented by the storage management layer may have a logical capacity, which may correspond to the number of available logical addresses in the logical address space and the size (or granularity) of the data referenced by the logical addresses. For example, the logical capacity of a logical address space comprising 2^32 unique logical addresses, each referencing 2048 bytes (2 KiB) of data may be 2^43 bytes. (As used herein, a kibibyte (KiB) refers to 1024 bytes). In some embodiments, the logical address space may be thinly provisioned. As used herein, a "thinly provisioned" logical address space refers to a logical address space having a logical capacity that exceeds the physical capacity of the underlying non-volatile memory device(s). For example, the storage management layer may present a 64-bit logical address space to the storage clients (e.g., a logical address space referenced by 64-bit logical addresses), which exceeds the physical capacity of the underlying non-volatile memory devices. The large logical address space may allow storage clients to allocate and/or reference contiguous ranges of logical addresses, while reducing the chance of naming conflicts. The storage management layer may leverage the any-to-any logical-to-physical mappings between logical addresses and physical storage resources to manage the logical address space independently of the underlying physical storage devices. For example, the storage management layer may add and/or remove physical storage resources seamlessly, as needed, and without changing the logical addresses used by the storage clients.

The non-volatile memory controller may be configured to store data in a contextual format. As used herein, a contextual format refers to a self-describing data format in which persistent contextual metadata is stored with the data on the physical storage media. The persistent contextual metadata provides context for the data it is stored with. In certain embodiments, the persistent contextual metadata uniquely identifies the data that the persistent contextual metadata is stored with. For example, the persistent contextual metadata may uniquely identify a sector of data owned by a storage client from other sectors of data owned by the storage client. In a further embodiment, the persistent contextual metadata identifies an operation that is performed on the data. In a further embodiment, the persistent contextual metadata identifies a sequence of operations performed on the data. In a further embodiment, the persistent contextual metadata identifies security controls, a data type, or other attributes of the data. In a certain embodiment, the persistent contextual metadata identifies at least one of a plurality of aspects, including data type, a unique data identifier, an operation, and a sequence of operations performed on the data. The persistent contextual metadata may include, but is not limited to: a logical address of the data, an identifier of the data (e.g., a file name, object id, label, unique identifier, or the like), reference(s) to other data (e.g., an indicator that the data is associated with other data), a relative position or offset of the data with respect to other data (e.g., file offset, etc.), data size and/or range, and the like. The contextual data format may comprise a packet format comprising a data segment and one or more headers. Alternatively, a contextual data format may associate data with context information in other ways (e.g., in a dedicated index on the non-volatile memory media, a memory division index, or the like).

In some embodiments, the contextual data format may allow data context to be determined (and/or reconstructed) based upon the contents of the non-volatile memory media, and independently of other metadata, such as the arbitrary, any-to-any logical-to-physical mappings discussed above. Since the media location of data is independent of the logical address of the data, it may be inefficient (or impossible) to determine the context of data based solely upon the media location or media address of the data. Storing data in a contextual format on the non-volatile memory media may allow data context to be determined without reference to other metadata. For example, the contextual data format may allow the metadata to be reconstructed based only upon the contents of the non-volatile memory media (e.g., reconstruct the any-to-any logical-to-physical mappings between logical addresses and physical media locations).

In some embodiments, the non-volatile memory controller may be configured to store data on one or more asymmetric, write-once media, such as solid-state storage media. As used herein, a "write once" storage medium refers to a storage medium that is reinitialized (e.g., erased) each time new data is written or programmed thereon. As used herein, an "asymmetric" storage medium refers to a storage medium having different latencies for different storage operations. Many types of solid-state storage media are asymmetric; for example, a read operation may be much faster than a write/program operation, and a write/program operation may be much faster than an erase operation (e.g., reading the media may be hundreds of times faster than erasing, and tens of times faster than programming the media). The memory media may be partitioned into memory divisions that can be erased as a group (e.g., erase blocks) in order to, inter alia, account for the asymmetric properties of the media. As such, modifying a single data segment in-place may require erasing the entire erase block comprising the data, and rewriting the modified data to the erase block, along with the original, unchanged data. This may result in inefficient "write amplification," which may excessively wear the media. Therefore, in some embodiments, the non-volatile memory controller may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (the erasure latency is no longer part of the critical path of a write operation).

The non-volatile memory controller may comprise one or more processes that operate outside of the regular path for servicing of storage operations (the "path" for performing a storage operation and/or servicing a storage request). As used herein, the "path for servicing a storage request" or "path for servicing a storage operation" (also referred to as the "critical path") refers to a series of processing operations needed to service the storage operation or request, such as a read, write, modify, or the like. The path for servicing a storage request may comprise receiving the request from a storage client, identifying the logical addresses of the request, performing one or more storage operations on non-volatile memory media, and returning a result, such as acknowledgement or data. Processes that occur outside of the path for servicing storage requests may include, but are not limited to: a groomer, de-duplication, and so on. These processes may be implemented autonomously and in the background, so that they do not interfere with or impact the performance of other storage operations and/or requests. Accordingly, these processes may operate independent of servicing storage requests.

In some embodiments, the non-volatile memory controller comprises a groomer, which is configured to reclaim memory divisions (e.g., erase blocks) for reuse. The write out-of-place paradigm implemented by the non-volatile memory controller may result in obsolete or invalid data remaining on the non-volatile memory media. For example, overwriting data X with data Y may result in storing Y on a new memory division (rather than overwriting X in place), and updating the any-to-any logical-to-physical mappings of the metadata to identify Y as the valid, up-to-date version of the data. The obsolete version of the data X may be marked as invalid, but may not be immediately removed (e.g., erased), since, as discussed above, erasing X may involve erasing an entire memory division, which is a time-consuming operation and may result in write amplification. Similarly, data that is no longer is use (e.g., deleted or trimmed data) may not be immediately removed. The non-volatile memory media may accumulate a significant amount of invalid data. A groomer process may operate outside of the critical path for servicing storage operations. The groomer process may reclaim memory divisions so that they can be reused for other storage operations. As used herein, reclaiming a memory division refers to erasing the memory division so that new data may be stored/programmed thereon. Reclaiming a memory division may comprise relocating valid data on the memory division to a new location. The groomer may identify memory divisions for reclamation based upon one or more factors, which may include, but are not limited to: the amount of invalid data in the memory division, the amount of valid data in the memory division, wear on the memory division (e.g., number of erase cycles), time since the memory division was programmed or refreshed, and so on.

The non-volatile memory controller may be further configured to store data in a log format. As described above, a log format refers to a data format that defines an ordered sequence of storage operations performed on a non-volatile memory media. In some embodiments, the log format comprises storing data in a pre-determined sequence of media addresses of the non-volatile memory media (e.g., within sequential pages and/or erase blocks of the media). The log format may further comprise associating data (e.g., each packet or data segment) with respective sequence indicators. The sequence indicators may be applied to data individually (e.g., applied to each data packet) and/or to data groupings (e.g., packets stored sequentially on a memory division, such as an erase block). In some embodiments, sequence indicators may be applied to memory divisions when the memory divisions are reclaimed (e.g., erased), as described above, and/or when the memory divisions are first used to store data.

In some embodiments the log format may comprise storing data in an "append only" paradigm. The non-volatile memory controller may maintain a current append point at a media address of the non-volatile memory device. The append point may be a current memory division and/or offset within a memory division. Data may then be sequentially appended from the append point. The sequential ordering of the data, therefore, may be determined based upon the sequence indicator of the memory division of the data in combination with the sequence of the data within the memory division. Upon reaching the end of a memory division, the non-volatile memory controller may identify the "next" available memory division (the next memory division that is initialized and ready to store data). The groomer may reclaim memory divisions comprising invalid, stale, and/or deleted data, to ensure that data may continue to be appended to the media log.

The log format described herein may allow valid data to be distinguished from invalid data based upon the contents of the non-volatile memory media, and independently of other metadata. As discussed above, invalid data may not be removed from the non-volatile memory media until the memory division comprising the data is reclaimed. Therefore, multiple "versions" of data having the same context may exist on the non-volatile memory media (e.g., multiple versions of data having the same logical addresses). The sequence indicators associated with the data may be used to distinguish invalid versions of data from the current, up-to-date version of the data; the data that is the most recent in the log is the current version, and previous versions may be identified as invalid.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description.

FIG. 1A depicts one embodiment of a system 100 for storage address translation. The system 100 comprises an address translation module 150. The address translation module 150 may be part of and/or in communication with a storage management layer (SML) 130. The SML 130 may operate on a non-volatile memory system 102 of a host computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 (and/or non-volatile memory controller 124) to a communication network, such as an Internet Protocol network, a Storage Area Network, or the like.

The computing device 110 may further comprise a non-transitory, computer readable storage media 114. The computer readable storage media 114 may comprise executable instructions configured to cause the computing device 110 (e.g., processor 111) to perform steps of one or more of the methods disclosed herein. Alternatively, or in addition, the storage management layer 130 and/or one or more modules thereof may be embodied as one or more computer readable instructions stored on the non-transitory storage media 114.

The storage management layer 130 may be configured to provide storage services to one or more storage clients 116. The storage clients 116 may include local storage clients 116 operating on the computing device 110 and/or remote, storage clients 116 accessible via the network (and network interface 113). The storage clients 116 may include, but are not limited to: operating systems, file systems, database applications, server applications, kernel-level processes, user-level processes, applications, drivers, hardware devices, and the like. In certain embodiments, a storage client 116 may comprise a user managing or accessing the computing device 110 and/or the non-volatile memory device 120. In another embodiment, a storage client 116 may comprise a separate chip, module, or other entity of the non-volatile memory device 120.

Figure 1B:
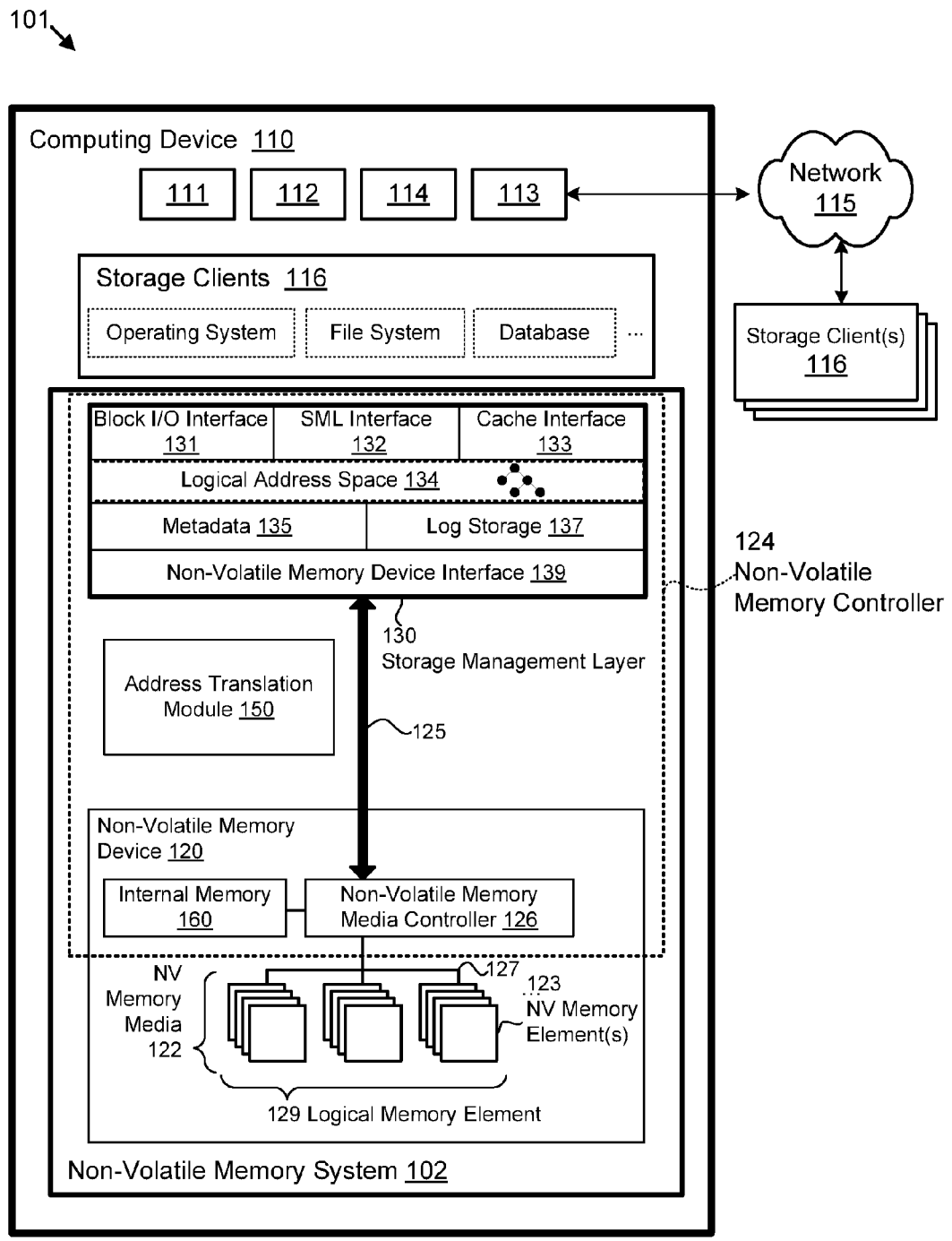
FIG. 1B is a schematic block diagram illustrating another embodiment of a system for storage address translation.

The storage management layer 130 comprises and/or is communicatively coupled to one or more non-volatile memory devices 120A-N. The non-volatile memory devices 120A-N may include different types of non-volatile memory devices including, but not limited to: solid-state storage devices, hard drives, SAN storage resources, or the like. The non-volatile memory devices 120A-N may comprise respective non-volatile memory media controllers 126A-N and non-volatile memory media 122A-N. As illustrated in FIG. 1B, The SML 130 may provide access to the non-volatile memory devices 120A-N via a traditional block I/O interface 131. Additionally, the SML 130 may provide access to enhanced functionality (large, virtual address space) through the SML interface 132. Metadata 135, including logical-to-physical mapping entries, may be used to manage and/or track storage operations performed through any of the Block I/O interface 131, SML interface 132, cache interface 133, or other, related interfaces.

The cache interface 133 may expose cache-specific features accessible via the storage management layer 130. Also, in some embodiments, the SML interface 132 presented to the storage clients 116 provides access to data transformations implemented by the non-volatile memory devices 120A-N and/or the non-volatile memory media controllers 126A-N.

The SML 130 may provide storage services through one or more interfaces, which may include, but are not limited to: a block I/O interface, an extended storage management layer interface, a cache interface, and the like. The SML 130 may present a logical address space 134 to the storage clients 116 through one or more interfaces. As discussed above, the logical address space 134 may comprise a plurality of logical addresses, each corresponding to respective media locations on one or more of the non-volatile memory devices 120A-N. The SML 130 may maintain metadata 135 comprising any-to-any logical-to-physical mappings between logical addresses and media locations, as described above. The SML 130 may include or may cooperate with an address translation module 150 as described below to manage the metadata 135, such as logical-to-physical mapping entries or the like.

In one embodiment, the metadata 135 includes a map or index, a "forward map," comprising a plurality of logical-to-physical mapping entries that map logical block addresses to physical block addresses or the like. Logical addresses used to identify stored data may represent a smaller number of logical addresses than the total available logical addresses within a namespace or range of possible logical addresses for the non-volatile memory device 120. Searching this sparsely populated logical address space 134 may be cumbersome and time consuming. For this reason, the forward map or other metadata 135 may comprise a data structure that facilitates quickly traversing the forward map to find a physical address based on a logical address. For example, the forward map or other metadata 135 may include a B-tree, a content addressable memory ("CAM"), a binary tree, a hash table, or other data structure that facilitates quickly searching a sparsely populated space or range. By using a forward map that quickly searches a sparsely populated logical namespace or address space, the SML 130, in certain embodiments, may provide an efficient way to determine one or more physical addresses from a logical address.

The SML 130 may further comprise a log storage module 137 that is configured to store data in a contextual, log format. The contextual, log data format may comprise associating data with persistent contextual metadata, such as the logical address of the data, or the like. The contextual, log format may further comprise associating data with respective sequence identifiers on the non-volatile memory media 122A-N, which define an ordered sequence of storage operations performed on the non-volatile memory devices 120A-N, as described above.

The SML 130 may further comprise a non-volatile memory device interface 139 configured to transfer data, commands, and/or queries to the non-volatile memory devices 120A-N over a bus 125, which may include, but is not limited to: a peripheral component interconnect express ("PCI Express" or "PCIe") bus, a serial Advanced Technology Attachment ("ATA") bus, a parallel ATA bus, a small computer system interface ("SCSI"), FireWire, Fibre Channel, a Universal Serial Bus ("USB"), a PCIe Advanced Switching ("PCIe-AS") bus, a network, Infiniband, SCSI RDMA, or the like. The non-volatile memory device interface 139 may communicate with the non-volatile memory devices 120A-N using input-output control ("IO-CTL") command(s), IO-CTL command extension(s), remote direct memory access, or the like.

The non-volatile memory system 102, in the depicted embodiment, includes an address translation module 150. The address translation module 150, in one embodiment, is configured to dynamically split, copy, and/or page the metadata 135 (e.g. logical-to-physical mapping entries), between volatile memory and the non-volatile memory media 122. The address translation module 150 may store certain logical-to-physical mapping entries 135 in volatile memory 112 of the host computing device 110 and/or in internal volatile memory of a non-volatile memory device 120, such as the internal memory 160 described below with regard to FIG. 1B, and may persist, evict, flush, or otherwise move logical-to-physical mapping entries 135 to the non-volatile memory media 122 to conserve or free storage capacity of the volatile memory 112 and/or 160. To service storage requests, the address translation module 150 may dynamically load logical-to-physical mapping entries from the non-volatile memory media 122 into the volatile memory 112 and/or 160.

By providing two levels of logical-to-physical mappings 135, one volatile and one non-volatile, and dynamically copying or paging entries between the two levels, the address translation module 150 may reduce or limit the amount of volatile memory 112 and/or 160 consumed by the logical-to-physical mapping entries 135, while maintaining the performance benefits of storing the logical-to-physical mapping entries 135 at least partially in the volatile memory 112 and/or 160. In certain embodiments, the address translation module 150 may select which logical-to-physical mapping entries 135 to store in the volatile memory 112 and/or 160 and which logical-to-physical mapping entries 135 to store in the non-volatile memory media 122 based on input from storage clients 116, such as applications, a file system, an operating system, a user, or the like.

For example, a storage client 116 may send an advisement message, such as an FADVISE message or the like, to the address translation module 150 indicating an intended access pattern for one or more logical addresses of the non-volatile memory device 120, the logical address space 134 may be divided into ranges or zones associated with different mapping policies, or the like. Selecting a mapping policy based on input from a storage client 116, in certain embodiments, may enable the address translation module 150 to intelligently and efficiently manage logical-to-physical mapping entries 135.

A storage client 116, in one embodiment, may select a mapping policy for a logical address, a logical address range, a file or the like, which the address translation module 150 may use to select which logical-to-physical mapping entries to store in the volatile memory 112 and/or 160, which logical-to-physical mapping entries to persist to non-volatile memory media 122, or the like. A mapping policy may comprise one or more hints, indicators, messages, directives, priorities, logic, rules, configuration settings, or the like indicating how a logical-to-physical mapping entry is to be managed. A mapping policy, in certain embodiments, may comprise a replacement policy for logical-to-physical mapping entries the address translation module stores or caches in volatile memory 112/160.

In one embodiment, a mapping policy informs the address translation module 150 in selecting logical-to-physical mapping entries to persist, evict, or flush from the volatile memory 112/160. In a further embodiment, a mapping policy informs the address translation module 150 in selecting logical-to-physical mapping entries to load into the volatile memory 112/160 from the non-volatile memory media 122. In various embodiments, a mapping policy may be associated with a single logical address, a set or range of logical addresses (either contiguous or noncontiguous), a file, a directory, a data object, or the like.

A storage client 116 may indicate and/or influence selection of a mapping policy for one or more logical-to-physical mapping entries either directly or indirectly. In certain embodiments, a storage client 116 may directly define, configure, dictate, select, and/or manage one or more mapping policies. For example, a storage client 116 may communicate a mapping policy definition, a mapping policy indicator, a mapping policy selection, a mapping policy setting, an access pattern indicator, or the like to the address translation module 150 as a function call, a hardware signal, or the like. In another embodiment, a storage client 116 may store a mapping policy definition, a mapping policy indicator, a mapping policy selection, a mapping policy setting, an access pattern indicator, or the like in a set of configuration settings for the storage client 116, such as a data file, a database entry, or the like and the address translation module 150 may determine a mapping policy for logical-to-physical mapping entries based on the set of configuration settings.

A software storage client 116, such as an application, a driver, a file system, an operating system, or the like, may be programmed with executable code configured to send or communicate a mapping policy definition, a mapping policy indicator, a mapping policy selection, a mapping policy setting, an access pattern indicator, or the like to the translation module 150. For example, a software storage client 116 may be customized or modified to create, send, or otherwise support sending advisement messages to the address translation module 150, such as the FADVISE advisement messages described below with regard to the advisement module 302 of FIG. 3.

In certain embodiments, a storage client 116 may indirectly indicate and/or influence a mapping policy for one or more logical-to-physical mapping entries. In one embodiment, the address translation module 150 may select a mapping policy for one or more logical-to-physical mapping entries based on a type of the associated storage client 116. For example, the address translation module may use a different mapping policy for application storage clients 116 than for file system storage clients 116, or the like. In another embodiment, a storage client 116 may indirectly indicate or influence a mapping policy based on the storage client's 116 access history of the logical addresses associated with one or more logical-to-physical mapping entries, as described below with regard to the access history module 304 of FIG. 3.

In one embodiment, the address translation module 150 may comprise executable software code, such as a device driver, SML 130, or the like, stored on the computer readable storage media 114 for execution on the processor 111 of the host computing device 110. In another embodiment the address translation module 150 may comprise logic hardware of one or more of the non-volatile memory devices 120A-N, such as a non-volatile memory media controller 126A-N, a non-volatile memory controller 124, a device controller, a field-programmable gate array ("FPGA") or other programmable logic, firmware for an FPGA or other programmable logic, microcode for execution on a microcontroller, an application-specific integrated circuit ("ASIC"), or the like. In a further embodiment, the address translation module 150 may include a combination of both executable software code and logic hardware.

In one embodiment, the address translation module 150 may be part of the SML 130, may be configured to receive storage requests from the SML 130 via a bus 125, or the like. The address translation module 150 may be further configured to transfer data to/from the SML 130 and/or storage clients 116 via the bus 125. Accordingly, the address translation module 150, in some embodiments, may comprise and/or be in communication with one or more direct memory access ("DMA") modules, remote DMA modules, bus controllers, bridges, buffers, and so on to facilitate the transfer of storage requests and associated data. In another embodiment, the address translation module 150 may receive storage requests as an application program interface ("API") call from a storage client 116, as an IO-CTL command, or the like. The address translation module 150 is described in greater detail below with regard to FIGS. 2 and 3.

FIG. 1B is a block diagram of another embodiment of a system 101 comprising an address translation module 150. As described above, the address translation module 150 may be part of and/or in communication with a storage management layer 130. The SML 130 may operate on a non-volatile memory system 102 of a computing device 110, which, as discussed above, may comprise a processor 111, volatile memory 112, communication interface 113, and non-transitory, computer readable storage media 114. The communication interface 113 may comprise one or more network interfaces configured to communicatively couple the computing device 110 (and/or non-volatile memory controller 124) to a network 115 and/or to one or more remote, network-accessible storage clients 116.

The computing device 110 may comprise a non-volatile memory controller 124 that is configured to provide storage services to the storage clients 116. The storage clients 116 may include local storage clients 116 operating on the computing device 110 and/or remote, storage clients 116 accessible via the network 115 (and network interface 113). The non-volatile memory controller 124 comprises one or more non-volatile memory devices 120. Although FIG. 1B depicts a single non-volatile memory device 120, the disclosure is not limited in this regard and could be adapted to incorporate any number of non-volatile memory devices 120.

The non-volatile memory device 120 may comprise non-volatile memory media 122, which may include but is not limited to: NAND flash memory, NOR flash memory, nano random access memory ("nano RAM or NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM or PCM"), magnetic storage media (e.g., hard disk, tape), optical storage media, or the like. While the non-volatile memory media 122 is referred to herein as "memory media," in various embodiments, the non-volatile memory media 122 may more generally comprise a non-volatile recording media capable of recording data, which may be referred to as a non-volatile memory media, a non-volatile storage media, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, and the like. A non-volatile memory media controller 126 may be configured to manage storage operations on the non-volatile memory media 122, and may comprise one or more processors, programmable processors (e.g., field-programmable gate arrays), or the like. In some embodiments, the non-volatile memory media controller 126 is configured to store data on (and read data from) the non-volatile memory media 122 in the contextual, log format described above, and to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. As discussed above, the logical memory element may be partitioned into respective logical memory units (e.g., logical pages) and/or logical memory divisions (e.g., logical erase blocks). The logical memory units may be formed by logically combining physical memory units of each of the non-volatile memory elements. For example, if the non-volatile memory media 122 comprises twenty-five (25) non-volatile memory elements, each logical memory unit may comprise twenty-five (25) pages (a page of each element of non-volatile memory media 122).

The non-volatile memory media controller 126 may further be communicatively coupled to an internal memory 160 of the non-volatile memory device 120. The internal memory 160 may comprise volatile and/or non-volatile memory including, but not limited to, static RAM ("SRAM"), dynamic RAM ("DRAM"), magneto-resistive RAM ("MRAM"), nano random access memory ("nano RAM or NRAM"), phase change RAM ("PRAM or PCM"), NAND flash memory, NOR flash memory, and the like. In certain embodiments, the internal memory 160 may be larger than a logical memory division such as a logical erase block.

The non-volatile memory controller 124 may comprise a SML 130 and the non-volatile memory media controller 126. The SML 130 may provide storage services to the storage clients 116 via one or more interfaces 131, 132, and/or 133. In some embodiments, the SML 130 provides a block-device I/O interface 131 through which storage clients 116 perform block-level I/O operations. Alternatively, or in addition, the SML 130 may provide a storage management layer (SML) interface 132, which may provide other storage services to the storage clients 116. In some embodiments, the SML interface 132 may comprise extensions to the block device interface 131 (e.g., storage clients 116 may access the SML interface 132 through extensions to the block device interface 131). Alternatively, or in addition, the SML interface 132 may be provided as a separate API, service, and/or library. The SML 130 may be further configured to provide a cache interface 133 for caching data using the non-volatile memory system 102.

As described above, the SML 130 may present a logical address space 134 to the storage clients 116 (through the interfaces 131, 132, and/or 133). The SML 130 may maintain metadata 135 comprising any-to-any logical-to-physical mappings between logical addresses in the logical address space 134 and media locations on the non-volatile memory device 120. The metadata 135 may comprise a logical-to-physical mapping structure with entries that map logical addresses in the logical address space 134 and media locations on the non-volatile memory device 120. The logical-to-physical mapping structure of the metadata 135, in one embodiment, is sparsely populated, with entries for logical addresses for which the non-volatile memory device 120 stores data and with no entries for logical addresses for which the non-volatile memory device 120 does not currently store data. The metadata 135, in certain embodiments, tracks data at a block level, with the SML 130 managing data as blocks.

The non-volatile memory system 102 may further comprise a log storage module 137, which, as described above, may be configured to store data on the non-volatile memory device 120 in a contextual, log format. The contextual, log data format may comprise associating data with a logical address on the non-volatile memory media 122. The contextual, log format may further comprise associating data with respective sequence identifiers on the non-volatile memory media 122, which define an ordered sequence of storage operations performed on the non-volatile memory media 122, as described above. The non-volatile memory controller 124 may further comprise a non-volatile memory device interface 139 that is configured to transfer data, commands, and/or queries to the non-volatile memory media controller 126 over a bus 125, as described above.

Figure 2:
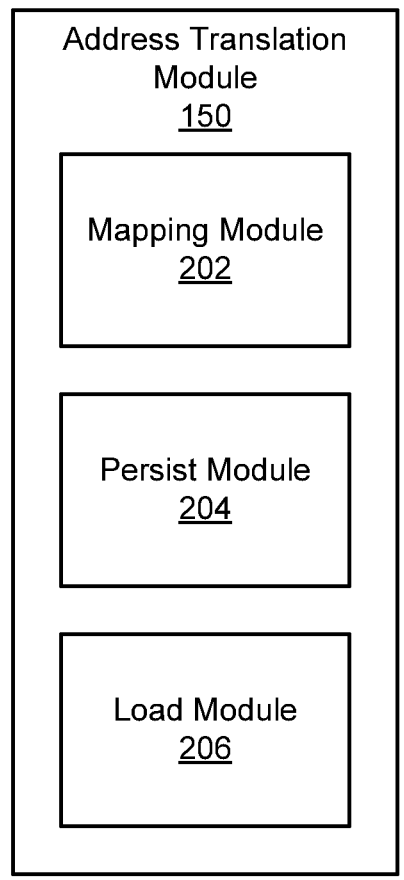
FIG. 2 is a schematic block diagram illustrating one embodiment of an address translation module.

FIG. 2 depicts one embodiment of an address translation module 150. The address translation module 150 may be substantially similar to the address translation module 150 described above with regard to FIGS. 1A and 1B. In general, as described above, the address translation module 150 translates logical addresses into physical addresses, using a split, two level logical-to-physical mapping structure. In the depicted embodiment, the storage request module 150 includes a mapping module 202, a persist module 204, and a load module 206.

In one embodiment, the mapping module 202 maps logical addresses for data stored in the non-volatile memory device 120 to physical locations in the non-volatile memory media 122 where the data is stored, allowing the SML 130 to provide wear-leveling for the non-volatile memory media 122. As described above, a logical address may comprise an LBA, a CHS address, a file name, an object identifier, an inode, a UUID, a GUID, a hash code, a signature, an index entry, a range, an extent, or the like. The mapping module 202 provides a level of abstraction between logical addresses used by storage clients 116 and physical block addresses at which the non-volatile memory media 122 store the data.

The mapping module 202, in certain embodiments, maintains one or more logical-to-physical mapping structures comprising logical-to-physical mapping entries mapping logical addresses to physical storage locations. By maintaining logical-to-physical mapping entries, the mapping module 202 allows data to be referenced in a logical address space 134 of the non-volatile memory device 120 using logical addresses. A logical address, without a mapping, does not indicate the physical location of data in the cache 102, but is an abstract reference to the data.

In certain embodiments, logical addresses of the non-volatile memory device 120 are independent of physical storage addresses of the non-volatile memory media 122, making the physical storage addresses and the non-volatile memory media 122 fully associative with the non-volatile memory device 120. Because the non-volatile memory media 122 is fully associative with the non-volatile memory media 122, any physical storage block of the non-volatile memory device 120 may store data associated with any logical address of the non-volatile memory device 120.

The mapping module 202 may use one or more mapping structures to maintain logical-to-physical mappings for the non-volatile memory device 120. A mapping structure, in various embodiments, may include a B-tree, B*-tree, B+-tree, a CAM, a binary tree, a hash table, an index, an array, a linked-list, a look-up table, or another mapping data structure. Use of a B-tree, a hash table, or the like as a mapping structure, in certain embodiments, may be particularly advantageous where the logical address space 134 presented to the storage clients 116 is a very large address space 134 (such as 2^64 addressable blocks or the like—which may or may not be sparsely populated). Because B-trees maintain an ordered structure, for example, searching such a large space 134 may remain very fast. An example embodiment of a B-tree as a mapping structure is described in greater detail with regard to FIG. 5.

For example, in one embodiment, a mapping structure may include a B-tree with multiple nodes and each node may store several entries. In the example embodiment, each entry may map a variable sized range or ranges of logical addresses of the non-volatile memory device 120 to a location on the physical memory media 122. In certain embodiments, the number of nodes in a B-tree may vary as the B-tree grows wider and/or deeper. Storing variable sized ranges of data associated with contiguous and/or non-contiguous ranges of logical addresses, in certain embodiments, is more efficient than storing single fixed sized blocks, as the non-volatile memory device 120 may more closely match data use patterns of the storage clients 116.

In one embodiment, the mapping structures of the mapping module 202 only includes a node or entry for logical addresses of the non-volatile memory device 120 that are associated with currently stored data. In this embodiment, membership in a mapping structure represents membership or storage in the non-volatile memory device 120. The mapping module 202, in one embodiment, adds entries, nodes, or the like to a mapping structure as data is stored in the non-volatile memory device 120 and removes entries, nodes, or the like from a mapping structure in response to data being evicted, cleared, trimmed, erased, or otherwise removed from the non-volatile memory device 120. Similarly, membership in a mapping structure may represent valid allocated blocks on the non-volatile memory media 122.

Nodes, entries, records, or the like of a mapping structure, in one embodiment, may include information (such as physical addresses, offsets, indicators, etc.) directly, as part of the mapping structure, or may include pointers, references, or the like for locating information indirectly in memory, in a table, or in another data structure. The mapping module 202, in one embodiment, may optimize a mapping structure by monitoring the shape of the mapping structure, monitoring the size of the mapping structure, balancing the mapping structure, enforcing one or more predefined rules with regard to the mapping structure, ensuring that leaf nodes of the mapping structure are at the same depth, combining nodes, splitting nodes, and/or otherwise optimizing the mapping structure.

The mapping module 202, in one embodiment, checkpoints or otherwise stores a copy of a mapping structure, changes or updates to a mapping structure, or the like to the non-volatile memory media 122 periodically. By storing a mapping structure in the non-volatile memory media 122, in a further embodiment, the mapping of logical addresses to locations on the physical memory media 122 are persistent, even if the non-volatile memory device 120 undergoes an unexpected or improper shutdown, power loss, or another restart event.

In a further embodiment, the mapping module 202 may be configured to reconstruct a mapping structure and included logical-to-physical mapping entries by scanning data on the non-volatile memory media 122, such as a sequential log-based writing structure or the like, and extracting logical addresses, sequence indicators, and the like from data at physical locations on the non-volatile memory media 122. For example, in certain embodiments, the non-volatile memory media controller 126 stores data of storage requests in a format that associates the data with sequence indicators for the data and with respective logical addresses for the data. If a mapping structure becomes lost or corrupted, the mapping module 202 may use the physical address or location of data in the non-volatile memory media 122 with the associated sequence indicators, logical addresses, and/or other metadata stored with the data, to reconstruct entries of the mapping structure.

In one embodiment, the mapping module 202 receives one or more logical addresses for a storage request from a storage client 116 and the mapping module 202 references a mapping structure to determine whether or not the non-volatile memory device 120 stores data associated with the storage request. The mapping module 202, in response to referencing a mapping structure, may provide information from the mapping structure to the non-volatile memory media controller 126, the SML 130, or the like, such as a physical storage address on the non-volatile memory media 122 for data of the storage request, a determination whether the non-volatile memory device 120 stores data of the storage request, or the like to assist the non-volatile memory media controller 126 and/or the SML 130 in servicing the storage request. In response to the non-volatile memory media controller 126 and/or the SML 130 servicing a storage request, in certain embodiments, the mapping module 202 updates a mapping structure to reflect changes or updates to logical-to-physical mappings for the non-volatile memory device 120 to service the storage request.

In one embodiment, the mapping module 202 stores a plurality of logical-to-physical mapping entries for the non-volatile memory device 120, such as a mapping structure, a portion of a mapping structure, or the like, in volatile memory, such as the internal volatile memory 160 of the non-volatile memory device 120 and/or the volatile memory 112 of the host computing device 110. Storing logical-to-physical mapping entries in volatile memory 112/160, in certain embodiments, may provide fast, low latency access to data of the non-volatile memory device 120, without unnecessary transactions with the non-volatile memory media 122, to retrieve logical-to-physical mapping entries or the like. However, to reduce or limit the amount of volatile memory 112/160 used for storing logical-to-physical mapping entries, in certain embodiments, the mapping module 202 stores one or more logical-to-physical mapping entries in the non-volatile memory media 122 of the non-volatile memory device 120, in addition to those logical-to-physical mapping entries stored in volatile memory 112/160.

In certain embodiments, the persist module 204 copies, persists, evicts, flushes, or otherwise moves one or more logical-to-physical mapping entries from the volatile memory 112/160 to the non-volatile memory media 122 to free capacity in the volatile memory 112/160. In one embodiment, if the non-volatile memory media 122 already stores a valid copy of a logical-to-physical mapping entry that the persist module 204 determines to persist, the persist module 204 may remove, evict, erase, trim, or otherwise clear the logical-to-physical mapping entry from the volatile memory 112/160 without copying or storing the entry to the non-volatile memory media 122, since the entry is already persisted.

The mapping module 202, in cooperation with the persist module 204 and the load module 206, may dynamically page or transfer logical-to-physical mapping entries between the volatile memory 112/160 and the non-volatile memory media 122 on demand during runtime to service storage requests using logical-to-physical mapping entries in the volatile memory 112/160 without storing all valid logical-to-physical mapping entries in the volatile memory 112/160. This means that during runtime, the mapping module 202 may store certain logical-to-physical mapping entries (e.g. a subset of logical-to-physical mapping entries for the non-volatile memory device 120) in volatile memory 112/160 while the persist module 204 stores different logical-to-physical mapping entries (e.g. a different subset of logical-to-physical mapping entries for the non-volatile memory device 120) in the non-volatile memory media 122.

The persist module 204, in certain embodiments, persists, evicts, flushes, or otherwise moves one or more logical-to-physical mapping entries from the volatile memory 112/160 to the non-volatile memory media 122 in response to a persist event for the one or more logical-to-physical mapping entries. In one embodiment, a persist event may occur based on a size of logical-to-physical mapping entries in the volatile memory 112/160 relative to a volatile memory allotment threshold. As used herein, a volatile memory allotment threshold is an amount of volatile memory assigned, allocated, selected for, or otherwise available to the mapping module 202 to store logical-to-physical mapping entries in volatile memory.

In one embodiment, a storage client 116 or other user may select a volatile memory allotment threshold for the mapping module 202. In another embodiment, an operating system, a memory manager, or the like may allocate or assign a volatile memory allotment threshold for the mapping module 202. In a further embodiment, a volatile memory allotment threshold may be determined by available storage capacity of the volatile memory 112/160 or other system constraints. The persist module 204, in certain embodiments, persists, evicts, or flushes one or more logical-to-physical mapping entries from the volatile memory 112/160 to the non-volatile memory media 122 to satisfy the volatile memory allotment threshold by maintaining the size of logical-to-physical mapping entries in the volatile memory 112/160 at or below the volatile memory allotment threshold or the like.

For example, the persist module 204 may persist, evict, flush, or otherwise move one or more logical-to-physical mapping entries from the volatile memory 112/160 to the non-volatile memory media 122 in response to a size of logical-to-physical mapping entries in the volatile memory 112/160 approaching the volatile memory allotment threshold. In a further embodiment, the persist module 204 may persist, evict, flush, or otherwise move one or more logical-to-physical mapping entries from the volatile memory 112/160 to the non-volatile memory media 122 in response to a size of logical-to-physical mapping entries in the volatile memory 112/160 exceeding a volatile memory allotment threshold.

In a further embodiment, a persist event may comprise a message or command from a storage client 116. For example, as described below with regard to the advisement module 302 of FIG. 3, a storage client 116 may send an advisement message comprising a directive to persist or evict one or more logical-to-physical mappings associated with a logical address, a range of logical addresses, or the like and the persist module 204 may persist, evict, flush, or otherwise move the one or more logical-to-physical mappings to the non-volatile memory media 122.

In an embodiment where the mapping module 202 stores logical-to-physical mapping entries in the volatile memory 112 of the host computing device 110, the persist module 204 may write logical-to-physical mapping entries to the non-volatile memory media 122 over a system communications bus 125 coupling the host computing device 110 and the non-volatile memory device 120. In another embodiment, where the mapping module 202 stores logical-to-physical mapping entries in the internal volatile memory 160 of the non-volatile memory device 120, the persist module 204 may write logical-to-physical mapping entries to the non-volatile memory media 122 over an internal communications bus 127 within the non-volatile memory device 120.

In one embodiment, the logical-to-physical mapping entries in the volatile memory 112/160 and in the non-volatile memory media 122 form a single distributed logical-to-physical mapping structure. In another embodiment, the logical-to-physical mapping entries in the volatile memory 112/160 and in the non-volatile memory media 122 comprise separate, independent mapping structures, which may have different data structure types. For example, the mapping module 202 may store logical-to-physical mapping entries in the volatile memory 112/160 as a B-tree, a hash table, or the like, while storing logical-to-physical mapping entries that the persist module 204 persists to the non-volatile memory media 122 as an index, table, array, linked list or the like.

The persist module 204, in certain embodiments, by selecting which logical-to-physical mapping entries to persist, also directly or indirectly selects which logical-to-physical mapping entries of the non-volatile memory device 120 to store in the volatile memory 112/160 and which logical-to-physical mapping entries to store in the non-volatile memory media 122. The persist module 204 may select logical-to-physical mapping entries to persist to the non-volatile memory device 120, logical-to-physical mapping entries to leave in the volatile memory 112/160, or the like, based on a mapping policy directly or indirectly selected by a storage client 116. As described above, a mapping policy may comprise one or more hints, indicators, messages, directives, priorities, logic, rules, configuration settings, or the like indicating how a logical-to-physical mapping entry is to be managed. In various embodiments, a mapping policy may be associated with a single logical address, a set or range of logical addresses (either contiguous or noncontiguous), a file, a directory, a data object, or the like.

In one embodiment, as described below with regard to the advisement module 302, the persist module 204 may select one or more logical-to-physical mapping entries to persist based on a mapping policy defined, determined, set, configured, or otherwise indicated by an advisement message from a storage client 116. In various embodiments, an advisement message may comprise an optional hint or a mandatory directive or command. For example, an advisement message may include an access pattern indicator indicating a normal access pattern, a random access pattern, a sequential access pattern, a do-not-need access pattern, a will-need access pattern, a no-reuse access pattern, or the like for one or more logical addresses to inform the persist module 204 what mapping policy to use to manage associated logical-to-physical mapping entries. The advisement module 302, in certain embodiments, may associate one or more predefined mapping policies with each access pattern indicator.

In a further embodiment, as described below with regard to the access history module 304 of FIG. 3, the persist module 204 may select one or more logical-to-physical mapping entries to persist or evict based on an access history of one or more logical addresses associated with the one or more logical-to-physical mapping entries. For example, the persist module 204 may persist or evict a least-recently-used logical-to-physical mapping entry, following a least-recently-used mapping policy, or the like.

In another embodiment, as described below with regard to the zone module 306, the persist module 204 may select one or more logical-to-physical mapping entries to persist or evict based on a zone or range in which a logical address associated with a logic-to-physical mapping is located. Different zones or ranges of logical addresses in the logical address space 134 may be associated with different mapping policies. In this manner, instead of or in addition to an explicit message or command, a storage client 116 may inform the address translation module 150 how the storage client 116 intends to use data and thereby select a mapping policy based on which logical address or range of logical addresses the storage client 116 selects for the data. In other embodiments, the persist module 204 may select one or more logical-to-physical mapping entries to persist or evict using a hybrid mode based on a combination of one or more of an advisement message, an access history, and/or a zone or range associated with a logical-to-physical mapping entry.

In one embodiment, the persist module 204 persists or evicts logical-to-physical mapping entries to a known, reserved range of logical addresses in a logical address space 134 of the non-volatile memory device 120, so that the logical-to-physical mapping entries stored in the non-volatile memory media 122 receive similar wear-leveling to other data and do not wear out a specific region of the non-volatile memory media 122. In such embodiments, the persist module 204 may store one or more logical-to-physical mapping entries in the non-volatile memory media 122 in cooperation with the log storage module 137, appending the entries to an append point of a sequential log-based writing structure or the like. To avoid recursive problems, where a logical-to-physical mapping entry would have to be retrieved from the non-volatile memory media 122 in order to locate the logical-to-physical mapping entry in the non-volatile memory media 122, in certain embodiments, one or more logical-to-physical mapping entries for the reserved range of logical addresses are pinned or locked in the volatile memory 112/160 so that the persist module 204 does not persist or evict the pinned logical-to-physical mapping entries to the non-volatile memory media 122, but they remain in the volatile memory 112/160.

In one embodiment, the SML 130 may mask the reserved range of logical addresses with an offset so that the reserved range of logical addresses is inaccessible to storage clients 116. For example, the SML 130 may add a predetermined offset value to each logical address received from a storage client 116, so that a reserved range of logical addresses the size of the offset is available for the persist module 204 to store logical-to-physical mapping entries in the non-volatile memory media 122.

In another embodiment, the persist module 204 may store logical-to-physical mapping entries in a predetermined physical storage location in the non-volatile memory media 122, such as in a first logical or physical erase block, or the like. For example, if the persist module 204 stores logical-to-physical mapping entries to the non-volatile memory media 122 at a relatively low rate, less than a rate at which workload data is written or the like, wear-leveling may not be necessary for the logical-to-physical mapping entries, and the persist module 204 may store them to the same physical location without wear-leveling.

In one embodiment, the persist module 204 may store logical-to-physical mappings to the non-volatile memory media 122 in a mapping structure, such as a B-tree, B*-tree, B+-tree, a CAM, a binary tree, a hash table, an index, an array, a linked-list, a look-up table, or another mapping data structure. In another embodiment, the persist module 204 may store logical-to-physical mappings to the non-volatile memory media 122 as changes or deltas to a previously stored mapping structure. The persist module 204 may periodically scan the non-volatile memory media 122 to consolidate the changes or deltas into a single mapping structure, or the like.

In one embodiment, the load module 206 loads one or more logical-to-physical mapping entries from the non-volatile memory media 122 of the non-volatile memory device 120 into the volatile memory 112/160. The load module 206, in certain embodiments, loads a logical-to-physical mapping entry in response to a storage request associated with the logical-to-physical mapping entry. In one embodiment, the load module 206 dynamically loads logical-to-physical mapping entries from the non-volatile memory media 122 of the non-volatile memory device 120 into the volatile memory 112/160 on demand to service storage requests as they arrive. In certain embodiments, the load module 206 may load or prefetch one or more logical-to-physical mapping entries from the non-volatile memory media 122 into the volatile memory 112/160 based on a mapping policy for the one or more logical-to-physical mapping entries.

For example, in certain embodiments, in response to a storage request such as a read request, a write request, an erase request, a TRIM request, or the like for one or more logical addresses, the mapping module 202 checks for a logical-to-physical mapping entry for the one or more logical addresses in a mapping structure in the volatile memory 112/160. If the mapping module 202 cannot locate a corresponding logical-to-physical mapping entry in the volatile memory 112/160, the mapping module 202 may request that the load module 206 locate and retrieve the corresponding logical-to-physical mapping entry from the non-volatile memory media 122. If the load module 206 also cannot locate the corresponding logical-to-physical mapping entry in the non-volatile memory media 122, a logical-to-physical mapping entry for the one or more logical addresses may not exist, and the mapping module 202 may create a logical-to-physical mapping entry in the volatile memory 112/160 to service the storage request or the like. In this manner, in certain embodiments, changes, updates, or other transactions with logical-to-physical mapping entries may occur exclusively in the volatile memory 112/160, as the load module 206 may load a logical-to-physical mapping entry into the volatile memory 112/160 prior to any transaction with the entry.

In this manner, the mapping module 202 cooperates with the persist module 204 and the load module 206 to dynamically page logical-to-physical mapping entries between the volatile memory 112/160 and the non-volatile memory media 122. For example, the persist module 204 may persist or evict one or more logical-to-physical mapping entries to free capacity in the volatile memory 112/160 and the load module 206 may load one or more logical-to-physical mapping entries into the freed capacity, so that the size of logical-to-physical mappings in the volatile memory 112/160 satisfies a volatile memory allotment threshold, as described above.

In certain embodiments, by dynamically paging logical-to-physical mapping entries, the address translation module 150 maintains the advantages of storing a mapping structure in volatile memory, while reducing the volatile memory footprint used by the address translation module 150. By intelligently selecting logical-to-physical mapping entries to persist or evict to the non-volatile memory media 122, using a mapping policy or other information from storage clients 116, access histories, or the like, the address translation module 150 may page logical-to-physical mapping entries with minimal impacts on latencies of storage requests.

Figure 3:
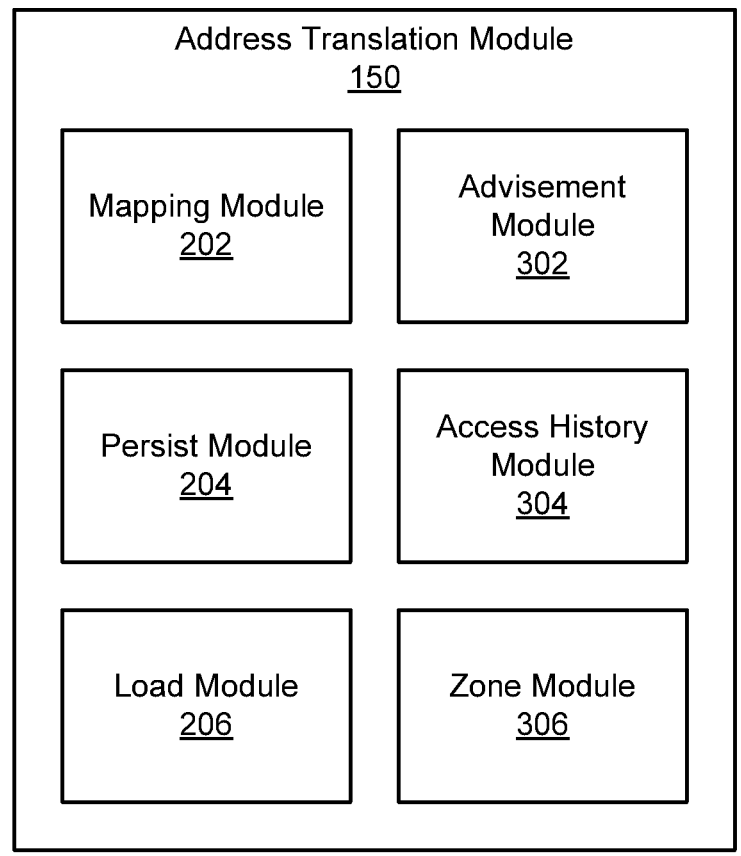
FIG. 3 is a schematic block diagram illustrating another embodiment of an address translation module.

FIG. 3 depicts another embodiment of an address translation module 150. The address translation module 150 may be substantially similar to the address translation module 150 described above with regard to FIGS. 1A, 1B, and/or 2. In the depicted embodiment, the storage request module 150 includes a mapping module 202, a persist module 204, and a load module 206 as described above with regard to FIG. 2 and further includes an advisement module 302, an access history module 304, and a zone module 306.

In one embodiment, the advisement module 302 cooperates with the persist module 204 to select a logical-to-physical mapping entry to persist or evict based on a mapping policy directly or indirectly indicated by an advisement message received from a storage client 116. An advisement message may select, define, determine, set, configure, dictate, manage, influence, or otherwise indicate a mapping policy directly, or the advisement module 302 and/or the persist module 204 may select a mapping policy indirectly, based on information from an advisement message. For example, an advisement message may directly include a mapping policy definition, a mapping policy indicator, a mapping policy selection, a mapping policy setting, or the like indicating a mapping policy for one or more logical-to-physical mapping entries. In other embodiments, an advisement message may indirectly influence or indicate a mapping policy. For example, an advisement message may include an access pattern indicator, as described below, and the advisement module 302 and/or the persist module 204 may select a mapping policy for one or more logical-to-physical mapping entries based on the access pattern indicator. In other embodiments, an access pattern indicator may directly or indirectly select or identify a mapping policy associated with the access pattern indicator.

The advisement module 302 may provide its own interface to storage clients 116 for receiving advisement messages, or may receive advisement messages from storage clients 116 over the block I/O interface 131, the SML interface 132, the cache interface 133, or the like. A message, such as an advisement message, may comprise a communication, a function call, a data structure, a register setting, a directive, a hint, an electrical signal or the like which the address translation module 150 may access, either directly or indirectly. In one embodiment, an advisement message may include a mapping policy, an indicator or other reference to a mapping policy, or the like, and an indicator of a logical address or set of logical addresses for which the mapping policy applies. In a further embodiment, an advisement message may include an access pattern indicator, as described below, and the advisement module 302 may associate one or more predefined mapping policies with each access pattern indicator. In certain embodiments, the advisement module 302 extends the POSIX FADVISE interface to receive advisement messages.

Instead of using FADVISE commands strictly for advising a page cache how to improve caching of workload data for a block device, in one embodiment, the advisement module 302 may support a custom, extended FADVISE command or command set allowing storage clients 116 to advise the address translation module 150 on management of logical-to-physical mapping entries. In one embodiment, an advisement message, such as an extended FADVISE command or the like, may comprise an access pattern indicator for one or more logical addresses and associated logical-to-physical mapping entries. An access pattern indicator identifies a storage client's 116 intended or planned usage of one or more logical addresses, and the advisement module 302 may cooperate with the persist module 204 and/or the load module 206 to implement a mapping policy for the logical-to-physical mapping entries associated with the one or more logical addresses.

In one embodiment, an access pattern indicator may identify a NORMAL access pattern indicating that the persist module 204 may use a default mapping policy to persist, evict, or retire logical-to-physical mapping entries for associated logical addresses. The persist module 204 may follow the default mapping policy in response to the advisement module 302 receiving no advisement messages for one or more logical addresses, or the like.

In one embodiment, an access pattern indicator may identify a RANDOM access pattern indicating that the persist module 204 may anticipate random data accesses for the associated one or more logical addresses. In response to a RANDOM access pattern indicator, the load module 206 may implement a mapping policy to fetch the associated logical-to-physical mapping entries asynchronously, and to pin or lock whichever of the entries into the volatile memory 112/160 as will fit to avoid an additional access of the non-volatile memory media 122.

In one embodiment, an access pattern indicator may identify a SEQUENTIAL access pattern indicating that the persist module 204 may anticipate sequential data accesses for the associated one or more logical addresses. In response to a SEQUENTIAL access pattern indicator, the load module 206 may implement a mapping policy to fetch and load the associated logical-to-physical mapping entries asynchronously as they are requested and to further fetch and load logical-to-physical mapping entries for the next one or more blocks, so that the next entries sequentially are already resident in the volatile memory 112/160 in preparation for a sequential access.

In one embodiment, an access pattern indicator may identify a DO-NOT-NEED access pattern indicating that the persist module 204 may safely implement a mapping policy to persist or evict the logical-to-physical mapping entries from the volatile memory 112/160, as the entries are not anticipated to be used in the near future. Conversely, in one embodiment, an access pattern indicator may identify a WILL-NEED access pattern indicating that a storage client 116 anticipates using the associated logical-to-physical mapping entries in the near future, and the persist module 204 may implement a mapping policy to leave, pin, or lock associated entries in the volatile memory 112/160 if they are already present and/or the load module 206 may implement a mapping policy to asynchronously fetch and load the entries into the volatile memory 112/160 if they are not yet present. In one embodiment, an access pattern indicator may identify a NO-REUSE access pattern indicating that once an associated logical-to-physical mapping entry has been used once that the persist module 204 may implement a mapping policy to persist or evict the entry from the volatile memory 112/160, as the entry is unlikely to be reused in the near future.

In one embodiment, the advisement module 302 supports soft advisement messages comprising an optional hint or suggestion from a storage client 116 indicating which mapping policy to use, and the address translation module 150 does not guarantee that the soft advisement messages will be honored. In a further embodiment, the advisement module 302 supports hard advisement messages or commands comprising a directive from a storage client 116, and the address translation module 150 is bound by the directive of the hard advisement messages. A hard advisement message, for example, may comprise a directive to persist or evict one or more associated logical-to-physical mapping entries, a directive to load one or more associated logical-to-physical mapping entries, a required mapping policy for associated logical-to-physical mapping entries, or the like. In certain embodiments, the advisement module 302 may support both soft and hard advisement messages.

One example advisement message format which the advisement module 302 may support is an extended or modified FADVISE command, with a format of "int fadvise (int fd, off_t offset, size_t len, int advice)" where int fd is a file descriptor or other logical address, off_t offset is a starting offset from fd in bytes or the like, size_t len is a size of the range of logical addresses in bytes or the like, and int advice is an access pattern identifier such as NORMAL, RANDOM, SEQUENTIAL, DO-NOT-NEED, WILL-NEED, NO-REUSE, or the like. In other embodiments, an advisement message may specify a priority level or quality-of-service level for one or more logical-to-physical mapping entries, where the address translation module 150 is more likely to store a higher priority level or quality-of-service level logical-to-physical mapping entry in the volatile memory 112/160 than a lower priority level or quality-of-service level logical-to-physical mapping entry. A selected priority level or quality-of-service level may comprise a mapping policy.

By sending advisement messages to the advisement module 302, storage clients 116 can select a mapping policy to optimize and/or customize caching of logical-to-physical mapping entries in the volatile memory 112/160, providing the address translation module 150 with an indicator of spacio-temporal locality of data, enabling the address translation module 150 to more efficiently manage paging of the logical-to-physical mapping entries. Since a logical-to-physical mapping entry, in certain embodiments, is smaller than a data block, hints from storage clients 116 may be more coarse grained than those for a page cache and may still be useful. With such small volatile memory requirements for mapping entries, an application or other storage client 116 may reduce access times for a given file by about half or more by sending an advisement message with an access pattern identifier of WILL-NEED to the advisement module 302, or the like.

In embodiments where the storage client 116 comprises a file system, the file system storage client 116 may use advisement messages to provide hints or directives for the address translation module 150 to select a mapping policy, even if other application storage clients 116 are not aware of or configured to use advisement messages, allowing the other application storage clients 116 to receive the benefits and optimizations that the advisement messages provide. For example, in cooperation with a file system storage client 116 and/or based on advisement messages and access pattern identifiers from a file system storage client 116, the load module 206 may asynchronously prefetch logical-to-physical mapping entries, while the persist module 204 may persist, evict, or flush other logical-to-physical mapping entries. In one embodiment, the address translation module 150 may cooperate with a file system storage client 116 to implement a mapping policy that gives a highest priority to logical-to-physical mapping entries of data blocks belonging to files that are open, that gives lesser priority to logical-to-physical mapping entries of data blocks belonging to files that are closed, and that gives a lowest priority to logical-to-physical mapping entries of blocks that have not been allocated to a file. In certain embodiments, the address translation module 150 may cooperate with a file system storage client 116, in response to an advisement message or the like, to use a mapping policy that maintains one or more logical-to-physical mapping entries for unallocated blocks in the volatile memory 112/160, to allow low-latency operations on free blocks that the file system storage client 116 expects to be used by files.

In one embodiment, the access history module 304 may select a logical-to-physical mapping entry for the persist module 204 to persist, evict, or flush based on an access history of a logical address associated with the selected logical-to-physical mapping entry. The access history module 304 may be used in place of or in conjunction with the advisement module 302 described above. For example, the access history module 304 may be used as a default policy when the advisement module 302 has not received an advisement message for a logical-to-physical mapping entry, when a storage client 116 does not support advisement messages or chooses not to send advisement messages, or the like.

The access history module 304, in certain embodiments, may cooperate with the SML 130 to monitor or track data access on a logical address or logical address range granularity. For example, the access history module 304 and/or the SML 130 may maintain frequency counts for logical addresses and/or ranges of logical addresses, may maintain a timestamp of a most recent access for logical addresses and/or ranges of logical addresses, or the like. The access history module 304, in one embodiment, cooperates with the persist module 204 to persist or evict a least-recently used logical-to-physical mapping entry from the volatile memory 112/160. In a further embodiment, the access history module 304 may cooperate with the persist module 204 to persist or evict a least-frequently used logical-to-physical mapping entry from the volatile memory 112/160. The access history module 304 may provide an estimate of a priority or an expected access pattern for logical-to-physical mapping entries when a storage client 116 has not specified a priority or an intended access pattern for the logical-to-physical mapping entries.

In one embodiment, the zone module 306 maintains a plurality of address zones or ranges within the logical address space 134 of the non-volatile memory device 120 and each zone or range is associated with a different logical-to-physical mapping policy. The address translation module 150 may provide mapping policies with differentiated quality-of-service for the different zones or ranges of the logical address space 134, such as a different maximum latency for each zone or range, or the like. For example, in a logical address range A-N, the load module 206 may use a mapping policy to pin or lock the associated logical-to-physical mapping entries in the volatile memory 112/160 while in a logical address range M-Z, the persist module 204 may use a mapping policy to immediately persist or evict the logical-to-physical mapping entries from the volatile memory 112/160 after use, or the like. In a further embodiment, a zone or range may comprise a pre-emptive prediction mapping policy, allowing the load module 206 to attempt to automatically determine a working set size and load the logical-to-physical mapping entries used, in cooperation with the access history module 304 or the like.

Instead of or in addition to sending explicit advisement messages to the advisement module 302, a storage client 116 may indicate a priority or quality-of-service level for data using the zone module 306 by writing the data to a zone or range of logical addresses associated with the desired priority or quality-of-service level. In one embodiment a storage client 116 or other user may define a zone or range for the zone module 306 statically and/or dynamically, using a utility, an API, a command-line interface, or another interface of the zone module 306. By dividing the logical address space 134, the zone module 306 may allow storage clients 116 to select various mapping policies without restricting use of the physical capacity of the non-volatile memory media 122 for each zone.

In embodiments where the zone module 306 provides a different maximum latency for mapping policies of each zone or range, the zone module 306 may define the maximum latency for a zone based on a property of the non-volatile memory device 120, such as the worst case latency due to paging logical-to-physical mapping entries, or another property of the non-volatile memory device 120. For example, the zone module 306 may provide maximum latency estimates or guarantees in ranges of microseconds or other units, and the address translation module 150 may manage storage and paging of logical-to-physical mapping entries for each zone to provide the estimated or guaranteed maximum latency for each zone or range.

While in the depicted embodiment, the address translation module 150 includes the advisement module 302, the access history module 304, and the zone module 306, in other embodiments, the address translation module 150 may not include any of the modules, may just include one or two of the modules, or the like. The address translation module 150 may operate in various modes. For example, in embodiments without an advisement module 302 and/or a zone module 306, or when a storage client 116 does not provide any advisement messages or other hints, the address translation module 150 may operate in an implicit mode, using a default mapping policy for logical-to-physical mapping entries, such as a least-recently-used mapping policy of the access history module 304 or the like.

The address translation module 150 may also support a hybrid mode for applications that provide occasional advisement messages or other hints using the advisement module 302, but the access history module 304 may continue to inform persists or evictions by the persist module 204 and loads by the load module 206 in addition to the advisement messages or other hints, at least for logical-to-physical mapping entries where no advisement messages or other hints are available. In a further embodiment, the address translation module 150 may support an explicit mode, where the address translation module 150 may rely exclusively on advisement messages or other hints from the storage clients 116 to inform persists or evictions by the persist module 204 and loads by the load module 206. In explicit mode, the address translation module 150 may continue to support a fall-back default mapping policy, provided by the access history module 304 or the like, should a storage client 116 fail to provide an advisement message, hint, or the like to select a mapping policy for a logical-to-physical mapping entry.

Figure 4:
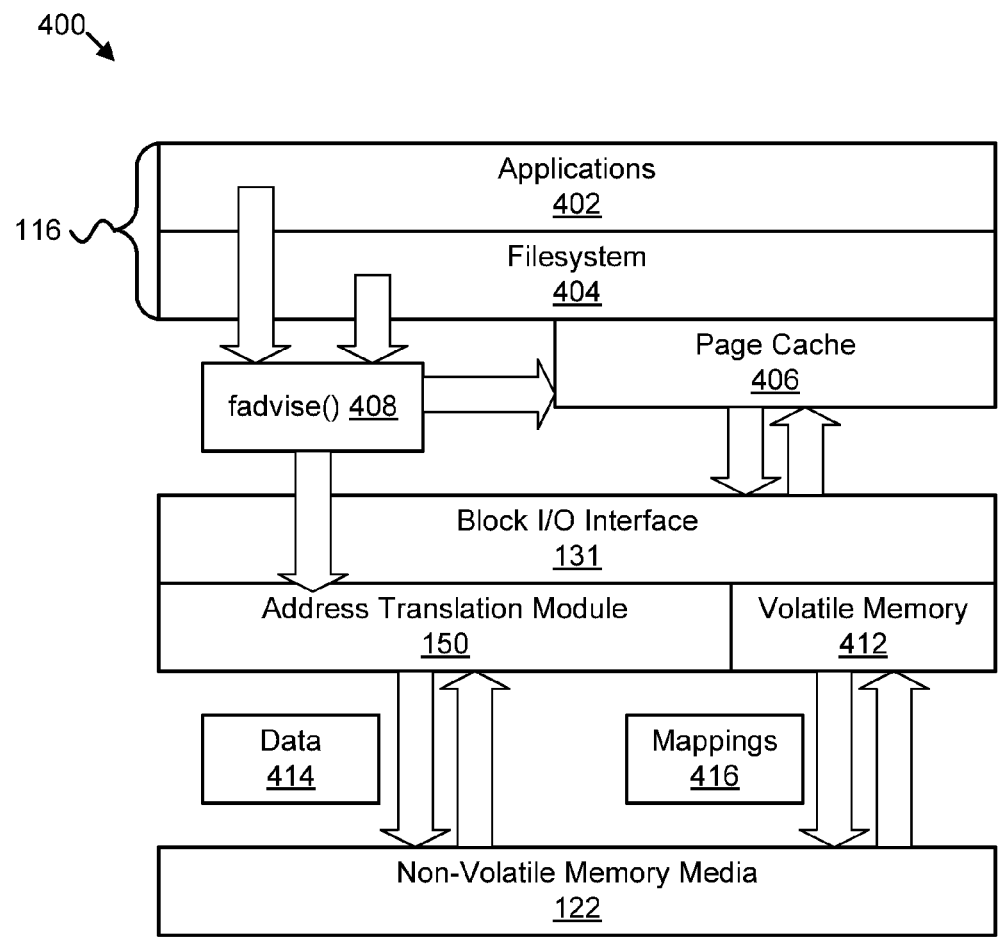
FIG. 4 is a schematic block diagram illustrating another embodiment of a system for storage address translation.

FIG. 4 depicts one embodiment of a system 400 for storage address translation. In the depicted embodiment, the storage clients 116 comprise applications 402 and a filesystem 404. Both the applications 402 and the filesystem 404 are configured to send FADVISE advisement messages 408 to the address translation module 150, using the advisement module 302 or the like as described above. As described above, even an application 402 that does not support or does not use FADVISE advisement messages 408 may receive the benefits of the address translation module 150 if the underlying filesystem 404 uses FADVISE advisement messages 408 to provide access pattern indicators or the like to the address translation module 150 for files of the filesystem 404.

In the depicted embodiment, the applications 402 and the filesystem 404 may also use FADVISE advisement messages 408 to inform a page cache 406 of an intended access pattern for data itself. While an FADVISE advisement message 408 may inform the page cache 406 of an operating system or the like how a storage client 116 intends to use data blocks, files, or the like, to facilitate more efficient caching of data, in certain embodiments, the address translation module 150 supports an extended or modified FADVISE advisement messages 408, which informs the address translation module 150 how a storage client 116 intends to access one or more logical-to-physical mapping entries 416, as described above.

The page cache 406 reads and writes (or loads and stores) data 414 to and from the non-volatile memory media 122 using storage requests to the block I/O interface 131. To service these storage requests, the address translation module 150 translates or maps logical addresses provided by the page cache 406 to physical addresses or physical locations in the non-volatile memory media 122. To facilitate this mapping or translation, the address translation module 150 pages logical-to-physical mapping entries 416 between volatile memory 412 and the non-volatile memory media 122 based on the FADVISE advisement messages 408 from the applications 402 and the filesystem 404. In one embodiment, the volatile memory 412 may comprise volatile memory 112 of a host computing device 110. In another embodiment, the volatile memory 412 may comprise internal volatile memory 160 of the non-volatile memory device 120. The address translation module 150 uses logical-to-physical mapping entries 416 in the volatile memory 412 to translate or map the logical addresses to physical addresses or locations in the non-volatile memory media 122, while storing lower priority or less frequently used logical-to-physical mapping entries in the non-volatile memory media 122. Once the address translation module 150 has translated or mapped a logical address to a physical address or location in the non-volatile memory media 122, the non-volatile memory media controller 126 may use the physical address or location to service the corresponding storage request (e.g. reading data 414 from the physical address or location, writing data 414 to the physical address or location, or the like).

Figure 5:
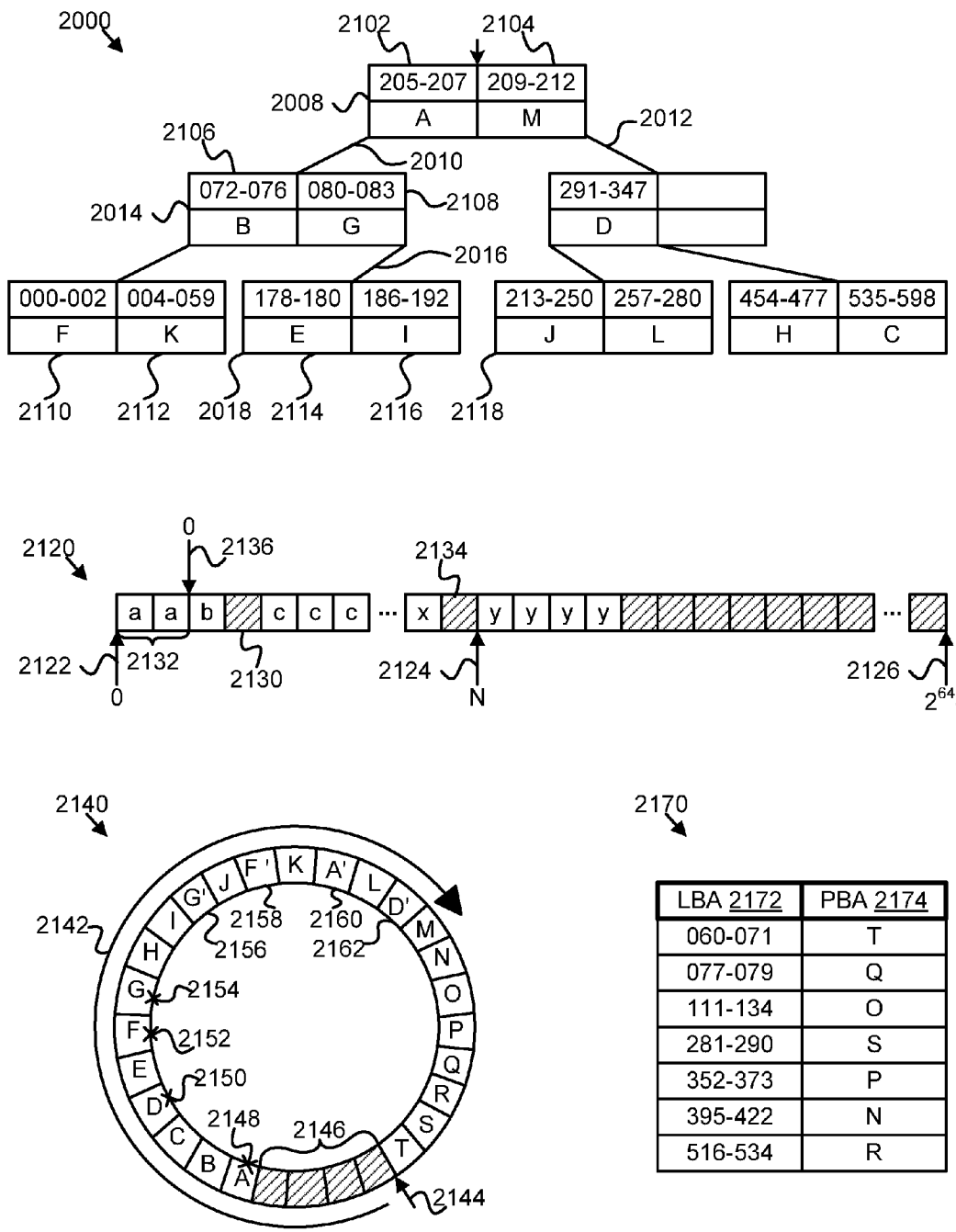
FIG. 5 is a schematic block diagram illustrating one embodiment of a mapping structure, a sparse logical address space, and a log-based writing structure.

FIG. 5 depicts one embodiment of a volatile mapping structure 2000, a sparse logical address space 2120, a log-based, append-only writing structure 2140, and a non-volatile mapping structure 2179. The mapping structure 2000, in one embodiment, is maintained by the mapping module 202 to map LBAs or other logical addresses to physical locations on the non-volatile memory media 122. The mapping structure 2000, in the depicted embodiment, is a B-tree with several entries. In the depicted embodiment, the nodes of the mapping structure 2000 include direct references to physical locations in the non-volatile memory device 120. In other embodiments, the mapping structure 2000 may include links that map to entries in a reverse map, or the like. The mapping structure 2000, in various embodiments, may be used either with or without a reverse map. In other embodiments, the references in the mapping structure 2000 may include alpha-numerical characters, hexadecimal characters, pointers, links, and the like. In certain embodiments, the mapping module 202 stores the mapping structure 2000 in volatile memory 412.

The mapping structure 2000, in the depicted embodiment, includes a plurality of nodes. Each node, in the depicted embodiment, is capable of storing two entries. In other embodiments, each node may be capable of storing a greater number of entries, the number of entries at each level may change as the mapping structure 2000 grows or shrinks through use, or the like.

Each entry, in the depicted embodiment, maps a variable length range of LBAs of the non-volatile memory device 120 to a physical location in the memory media 122 for the non-volatile memory device 120. Further, while variable length ranges of LBAs, in the depicted embodiment, are represented by a starting address and an ending address, in other embodiments, a variable length range of LBAs may be represented by a starting address and a length, or the like. In one embodiment, the capital letters 'A' through 'M' represent a logical or physical erase block in the physical memory media 122 of the non-volatile memory device 120 that stores the data of the corresponding range of LBAs. In other embodiments, the capital letters may represent other physical addresses or locations of the non-volatile memory device 120. In the depicted embodiment, the capital letters 'A' through 'M' are also depicted in the log-based writing structure 2140 which represents the physical memory media 122 of the non-volatile memory device 120.

In the depicted embodiment, membership in one of the volatile mapping structure 2000 or in the non-volatile mapping structure 2170, described below, denotes membership (or storage) in the non-volatile memory device 120. In another embodiment, an entry may further include an indicator of whether the non-volatile memory device 120 stores data corresponding to a logical block within the range of LBAs, data of a reverse map, and/or other data.

In the depicted embodiment, the root node 2008 includes entries 2102, 2104 with noncontiguous ranges of LBAs. A "hole" exists at LBA "208" between the two entries 2102, 2104 of the root node, and an entry for the "hole" is not stored in the non-volatile mapping structure 2170. In one embodiment, a "hole" indicates that the non-volatile memory device 120 does not store data corresponding to one or more LBAs corresponding to the "hole." In one embodiment, the non-volatile memory device 120 supports block I/O requests (read, write, trim, etc.) with multiple contiguous and/or noncontiguous ranges of LBAs (i.e. ranges that include one or more "holes" in them). A "hole," in one embodiment, may be the result of a single block I/O request with two or more noncontiguous ranges of LBAs. In a further embodiment, a "hole" may be the result of several different block I/O requests with LBA ranges bordering the "hole."

In the depicted embodiment, similar "holes" or noncontiguous ranges of LBAs exist in the volatile mapping structure 2000 between the entries 2106, 2108 of the node 2014, between the entries 2110, 2112 of the left child node of the node 2014, between entries 2114, 2116 of the node 2018, and between entries of the node 2118, however some of these "holes" have mappings in the non-volatile mapping structure 2170. In one embodiment, similar "holes" may also exist between entries in parent nodes and child nodes. For example, in the depicted embodiment, a "hole" of LBAs "060-071" exists between the left entry 2106 of the node 2014 and the right entry 2112 of the left child node of the node 2014, however a mapping entry for LBAs "060-071" is stored in the non-volatile mapping structure 2170.

The "hole" at LBA "003," in the depicted embodiment, can also be seen in the logical address space 2120 of the non-volatile memory device 120 at logical address "003" 2130. The hash marks at LBA "003" 2140 represent an empty location, or a location for which the non-volatile memory device 120 does not store data. The "hole" at LBA 2134 in the logical address space 2120, is due to one or more block I/O requests with noncontiguous ranges, a trim or other deallocation command to the non-volatile memory device 120, or the like. The mapping structures 2000, 2170 support "holes," noncontiguous ranges of LBAs, and the like due to the sparse and/or thinly provisioned nature of the logical address space 2120.

The logical address space 2120 of the non-volatile memory device 120, in the depicted embodiment, is sparse and/or thinly provisioned, and is larger than the physical storage capacity and corresponding storage device address space of the non-volatile memory device 120. In the depicted embodiment, the non-volatile memory device 120 has a 64 bit logical address space 2120 beginning at logical address "0" 2122 and extending to logical address "$2^{64}-1$" 2126. Because the storage device address space corresponds to only a subset of the logical address space 2120 of the non-volatile memory device 120, the rest of the logical address space 2120 may be allocated, mapped, and used for other functions of the non-volatile memory device 120. The SML 130, in the depicted embodiment, uses an offset 2136 in the logical address space 2120 to mask a reserved range 2132 of logical addresses, so that the non-volatile mapping structure 2170 may be stored in the reserved range 2132, which is inaccessible to storage clients 116.

The sequential, log-based, append-only writing structure 2140, in the depicted embodiment, is a logical representation of the physical memory media 122 of the non-volatile memory device 120. In certain embodiments, the non-volatile memory device 120 stores data sequentially, appending data to the log-based writing structure 2140 at an append point 2144. The non-volatile memory device 120, in a further embodiment, uses a storage space recovery process, such as a garbage collection module or other storage space recovery module that re-uses non-volatile memory media 122 storing deallocated/unused logical blocks. Non-volatile storage media storing deallocated/unused logical blocks, in the depicted embodiment, is added to an available storage pool 2146 for the non-volatile memory device 120. By clearing invalid data from the non-volatile memory device 120, as described above, and adding the physical storage capacity corresponding to the cleared data back to the available storage pool 2146, in one embodiment, the log-based writing structure 2140 is cyclic, ring-like, and has a theoretically infinite capacity.

In the depicted embodiment, the append point 2144 progresses around the log-based, append-only writing structure 2140 in a circular pattern 2142. In one embodiment, the circular pattern 2142 wear balances the non-volatile memory media 122, increasing a usable life of the non-volatile memory media 122. In the depicted embodiment, a garbage collection module or other storage capacity recovery process has marked several blocks 2148, 2150, 2152, 2154 as invalid, represented by an "X" marking on the blocks 2148, 2150, 2152, 2154. The garbage collection module, in one embodiment, will recover the physical storage capacity of the invalid blocks 2148, 2150, 2152, 2154 and add the recovered capacity to the available storage pool 2146. In the depicted embodiment, modified versions of the blocks 2148, 2150, 2152, 2154 have been appended to the log-based writing structure 2140 as new blocks 2156, 2158, 2160, 2162 in a read, modify, write operation or the like, allowing the original blocks 2148, 2150, 2152, 2154 to be recovered.

The non-volatile mapping structure 2170, in the depicted embodiment, comprises a table of physical addresses 2174 indexed by LBA 2172 range. In other embodiments, the non-volatile mapping structure 2170 and/or the volatile mapping structure 2000 may comprise a hash table such as a chained hash table, a set-associative hash table, or another data structure. To efficiently manage the volatile memory 412 consumed by the volatile mapping structure 2000, the persist module 204 persists, evicts, or flushes entries from the volatile mapping structure 2000 to the non-volatile mapping structure 2170, based on advisement messages, hints, priorities, quality-of-service levels, access histories, or the like. In response to storage requests for an LBA 2172 with an entry in the non-volatile mapping structure 2170, the load module 206 loads the entry from the non-volatile mapping structure 2170 back into the volatile mapping structure 2000.

In this manner the address translation module 150 may dynamically page and swap logical-to-physical mapping entries between a volatile mapping structure 2000 in volatile memory 412 and a non-volatile mapping structure 2170 in non-volatile memory media 122, taking advantage of the access speeds of the volatile memory 412 while making efficient use of the storage capacity of the non-volatile memory media 122. For example, storing a volatile mapping structure 2000 for 50 TiB of non-volatile memory media with a 4 KiB block size, in certain embodiments, may use up to about 500 GiB of volatile memory 412, much more than most host computing devices 110 or non-volatile memory devices 120 have available. Paging the logical-to-physical mapping entries out of the volatile mapping structure 2000 to the non-volatile memory media 122, which in the example as a 50 TiB capacity, may make much more efficient use of the available volatile memory 412, while sacrificing few if any of the benefits, and providing storage clients 116 with the option to more directly manage how their own logical-to-physical mapping entries are stored and prioritized.

Figure 6:
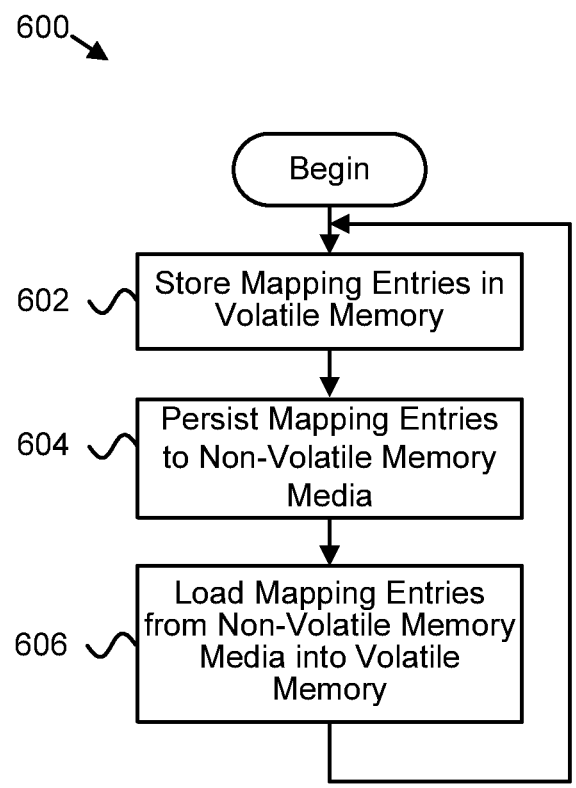
FIG. 6 is a schematic flow chart diagram illustrating one embodiment of a method for storage address translation.

FIG. 6 depicts one embodiment of a method 600 for storage address translation. The method 600 begins and the mapping module 202 stores 602, in volatile memory 412, logical-to-physical mapping entries 416 mapping logical addresses 2172 to physical locations 2174 in a non-volatile memory device 120. The persist module 204 dynamically persists 604 logical-to-physical mapping entries 416 from the volatile memory 412 to non-volatile memory media 122 of the non-volatile memory device 120. The load module 206 dynamically loads 606 logical-to-physical mapping entries 416 from the non-volatile memory media 122 of the non-volatile memory device 120 into the volatile memory 412 to service storage requests and the method 600 ends.

In various embodiments, a means for storing, in volatile memory, a plurality of logical-to-physical mapping entries may include an address translation module 150, a mapping module 202, a volatile memory controller, a non-volatile memory controller 124, a non-volatile memory media controller 126, a device driver such as a SML 130, a processor 111, other logic hardware, and/or other executable code stored on a computer readable storage medium. Other embodiments may include similar or equivalent means for storing a plurality of logical-to-physical mapping entries in volatile memory.

In various embodiments, a means for receiving a storage request for a non-volatile memory device may include an address translation module 150, a mapping module 202, a non-volatile memory controller 124, a non-volatile memory media controller 126, a device driver such as a SML 130, a processor 111, a block I/O interface 131, a SML interface 132, a cache interface 133, other logic hardware, and/or other executable code stored on a computer readable storage medium. Other embodiments may include similar or equivalent means for receiving a storage request.

In various embodiments, a means for persisting a logical-to-physical mapping entry from a volatile memory to non-volatile memory media may include an address translation module 150, a persist module 204, a mapping module 202, an advisement module 302, an access history module 304, a zone module 306, a volatile memory controller, a non-volatile memory controller 124, a non-volatile memory media controller 126, a device driver such as a SML 130, a processor 111, other logic hardware, and/or other executable code stored on a computer readable storage medium. Other embodiments may include similar or equivalent means for persisting a logical-to-physical mapping entry.

In various embodiments, a means for loading a logical-to-physical mapping entry from non-volatile memory media into a volatile memory may include an address translation module 150, a load module 206, a mapping module 202, a volatile memory controller, a non-volatile memory controller 124, a non-volatile memory media controller 126, a device driver such as a SML 130, a processor 111, other logic hardware, and/or other executable code stored on a computer readable storage medium. Other embodiments may include similar or equivalent means for loading a logical-to-physical mapping entry.

In various embodiments, a means for selecting a logical-to-physical mapping entry to persist may include an address translation module 150, a persist module 204, a mapping module 202, an advisement module 302, an access history module 304, a zone module 306, a volatile memory controller, a non-volatile memory controller 124, a non-volatile memory media controller 126, a device driver such as a SML 130, a processor 111, other logic hardware, and/or other executable code stored on a computer readable storage medium. Other embodiments may include similar or equivalent means for selecting a logical-to-physical mapping entry to persist.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method for storage address translation, the method comprising:
   storing, in volatile memory, a plurality of logical-to-physical mapping entries for a non-volatile storage device;
   copying one of the logical-to-physical mapping entries from the volatile memory to storage media of the non-volatile storage device, the logical-to-physical mapping entry selected for copying based on a mapping policy indicated by a client, the mapping policy based, at least in part, on a quality-of-service level associated with the logical-to-physical mapping entry to provide a differentiated quality-of-service for different logical-to-physical mapping entries, wherein the logical-to-physical mapping entry is copied to a reserved range of logical addresses, one or more logical-to-physical mapping entries for the reserved range of logical addresses pinned in the volatile memory; and
   loading the logical-to-physical mapping entry from the storage media of the non-volatile storage device into the volatile memory in response to a storage request associated with the logical-to-physical mapping entry.

2. The method of claim 1, further comprising receiving an advisement message from the client, the advisement message indicating the mapping policy for the logical-to-physical mapping entry.

3. The method of claim 2, wherein the advisement message comprises an access pattern indicator for a logical address associated with the logical-to-physical mapping entry, and the mapping policy is determined at least in part based on the access pattern indicator.

4. The method of claim 2, wherein the advisement message comprises a directive indicating that the logical-to-physical mapping entry is to be copied.

5. The method of claim 1, further comprising determining the mapping policy based on a type of the client.

6. The method of claim 1, further comprising determining the mapping policy based on a set of configuration settings for the client.

7. The method of claim 1, further comprising selecting a subsequent logical-to-physical mapping entry to copy based on an access history of a logical address associated with the subsequent logical-to-physical mapping entry.

8. The method of claim 1, wherein a logical address space of the non-volatile storage device is divided into zones and the logical-to-physical mapping entry is selected for copying based on the mapping policy of a zone associated with the logical-to-physical mapping entry.

9. The method of claim 8, further comprising providing the differentiated quality-of-service for the different zones of the logical address space based on the different mapping policies.

10. The method of claim 9, wherein the differentiated quality-of-service comprises different maximum latencies for each zone, the logical-to-physical mapping entry selected for copying to provide a specified maximum latency for the zone associated with the logical-to-physical mapping entry.

11. The method of claim 1, wherein the storage media of the non-volatile storage device is fully associative with a logical address space of the non-volatile storage device.

12. The method of claim 1, wherein the plurality of logical-to-physical mapping entries in volatile memory comprise a logical-to-physical mapping structure, the logical-to-physical mapping structure being sparsely populated by comprising entries only for logical addresses for which the non-volatile storage device stores data, and the entries being dynamically paged between the volatile memory and the storage media.

13. The method of claim 1, wherein the logical-to-physical mapping entry maps a logical address of a logical address space of the non-volatile storage device to a physical location where data of the logical address is stored within a sequential log-based writing structure of the non-volatile storage device.

14. The method of claim 1, further comprising masking the reserved range of logical addresses with an offset such that the reserved range of logical addresses is inaccessible to clients.

15. The method of claim 1, wherein the volatile memory comprises internal memory of the non-volatile storage device.

16. An apparatus for storage address translation, the apparatus comprising:
    a mapping module configured to store, in volatile memory, logical-to-physical mapping entries mapping logical addresses to physical locations in a non-volatile memory device;
    a persist module configured to dynamically flush one or more of the logical-to-physical mapping entries from the volatile memory to non-volatile memory media of the non-volatile memory device based on a plurality of client selectable mapping policies for the logical-to-physical mapping entries, wherein the one or more flushed logical-to-physical mapping entries are flushed to a reserved range of logical addresses, one or more logical-to-physical mapping entries for the reserved range of logical addresses pinned in the volatile memory; and a load module configured to dynamically load one or more logical-to-physical mapping entries from the non-volatile memory media of the non-volatile memory device into the volatile memory to service storage requests without loading one or more additional logical-to-physical mapping entries from the non-volatile memory media.

17. The apparatus of claim 16, further comprising an advisement module configured to receive an advisement message from a client, wherein the persist module is further configured to select a logical-to-physical mapping entry to flush based on a mapping policy indicated by the advisement message.

18. The apparatus of claim 16, further comprising an access history module configured to select a logical-to-physical mapping entry for the persist module to flush based on an access history of a logical address associated with the selected logical-to-physical mapping entry.

19. The apparatus of claim 16, further comprising a zone module configured to maintain a plurality of address ranges within a logical address space of the non-volatile memory device, each address range associated with a mapping policy, wherein the persist module is further configured to select a logical-to-physical mapping entry to flush based on the mapping policy of an address range of a logical address associated with the selected logical-to-physical mapping entry.

20. A system for storage address translation, the system comprising:
  a non-volatile storage device coupled to a host computing device, the non-volatile storage device comprising non-volatile storage media; and
  a storage management layer for the non-volatile storage device, the storage management layer executing on the host computing device, the storage management layer configured to;
    receive an advisement message from a client, the advisement message indicating a mapping policy for one or more logical-to-physical mapping entries for the non-volatile storage device;
    evict one of the logical-to-physical mapping entries from volatile memory of the host computing device to the non-volatile storage media of the non-volatile storage device based on the mapping policy, the eviction freeing capacity of the volatile memory, wherein the evicted logical-to-physical mapping entry is evicted to a reserved range of logical addresses, one or more logical-to-physical mapping entries for the reserved range of logical addresses pinned in the volatile memory; and
    load a different logical-to-physical mapping entry from the non-volatile storage media into the freed capacity of the volatile memory.

21. The system of claim 20, further comprising the host computing device, the non-volatile storage device coupled to the host computing device over a communications bus, the storage management layer configured to evict the logical-to-physical mapping entry to the non-volatile storage media over the communications bus.

22. A computer program product comprising a non-transitory computer readable storage medium storing computer usable program code executable to perform operations for storage address translation, the operations comprising:
  selecting one or more logical-to-physical mapping entries of a non-volatile storage device to store in volatile memory based on a mapping policy for the one or more logical-to-physical mapping entries;
  selecting one or more different logical-to-physical mapping entries of the non-volatile storage device to store in storage media of the non-volatile storage device based on a different mapping policy for the different logical-to-physical mapping entries, the one or more different logical-to-physical mapping entries stored to a reserved range of logical addresses, one or more logical-to-physical mapping entries for the reserved range of logical addresses pinned in the volatile memory; and
  loading the one or more different logical-to-physical mapping entries from the storage media of the non-volatile storage device into the volatile memory to service a storage request.

23. The computer program product of claim 22, the operations further comprising servicing the storage request using the one or more different logical-to-physical mapping entries in the volatile memory.

24. An apparatus for storage address translation, the apparatus comprising:
  means for receiving a storage request for a non-volatile memory device;
  means for loading a logical-to-physical mapping entry from non-volatile memory media of the non-volatile memory device into volatile memory, the logical-to-physical mapping entry associated with the storage request; and
  means for moving a different logical-to-physical mapping entry from the volatile memory to the non-volatile memory media of the non-volatile memory device to satisfy a volatile memory allotment threshold for logical-to-physical mapping entries in the volatile memory, the different logical-to-physical mapping entry moved to a reserved range of logical addresses, one or more logical-to-physical mapping entries for the reserved range of logical addresses pinned in the volatile memory.

25. The apparatus of claim 24, further comprising means for selecting the different logical-to-physical mapping entry to move based on one or more client configurable mapping policies.

* * * * *